United States Patent
Hakuta et al.

[11] Patent Number: 6,140,441
[45] Date of Patent: Oct. 31, 2000

[54] ETHYLENIC RANDOM COPOLYMER, PROCESS FOR PREPARING THE SAME, AND RUBBER COMPOSITION

[75] Inventors: Takashi Hakuta; Mikio Hosoya; Tetsuo Tojo; Masaaki Kawasaki, all of Ichihara, Japan

[73] Assignee: Mitsui Chemicals, Inc., Tokyo, Japan

[21] Appl. No.: 08/983,636

[22] PCT Filed: May 28, 1997

[86] PCT No.: PCT/JP97/01815

§ 371 Date: Mar. 30, 1998

§ 102(e) Date: Mar. 30, 1998

[87] PCT Pub. No.: WO97/45466

PCT Pub. Date: Dec. 4, 1997

[30] Foreign Application Priority Data

May 28, 1996 [JP] Japan ................................. 8/133409
Oct. 11, 1996 [JP] Japan ................................. 8/270160
Apr. 23, 1997 [JP] Japan ................................. 9/106360

[51] Int. Cl.$^7$ .................................................. C08F 210/18
[52] U.S. Cl. ...................... 526/348; 526/169.2; 526/336; 526/227; 526/308; 525/332.1
[58] Field of Search ................................. 526/169.2, 336, 526/227, 348, 308; 525/332.1

[56] References Cited

U.S. PATENT DOCUMENTS 4,588,794  5/1986  Oda et al. .............................. 526/169.2

FOREIGN PATENT DOCUMENTS 49-14542  4/1974  Japan .

*Primary Examiner*—David W. Wu
*Assistant Examiner*—Ling-Siu Choi
*Attorney, Agent, or Firm*—Birch, Stewart, Kolasch & Birch, LLP.

[57] ABSTRACT

A process for preparing an ethylene/α-olefin/norbornene nonconjugated polyene random copolymer, comprising preparing an ethylene random copolymer simultaneously meeting the following requirements (1) to (5):

(1) the molar ratio of ethylene (a) to an α-olefin (b) having 3 to 20 carbon atoms ranges from 40:60 to 95:5;

(2) a given amount of non conjugated polyene (c) has a norbornene skeleton;

(3) the available network chain density ν is not less than $1.5 \times 10^{20}/cm^3$ after press cross-linking of the copolymer using a dicumyl peroxide;

(4) the ratio of the rate γ1 of shear showing a shearing stress of $0.4 \times 10^6$ dyn/cm$^2$ as determined from the melt flow curve at 100° C. and the rate γ2 of shear showing a shearing stress of $2.4 \times 10^6$ dyn/cm$^2$, that is γ2/γ1 and the available network chain density ν has a relationship represented by the following general formula: $0.04 \times 10^{-19} \leq \text{Log}(\gamma 2/\gamma 1)/\nu \leq 0.20 \times 10^{-19}$; and (5) the intrinsic viscosity [η] ranges from 0.5 to 10 dl/g as measured in decalin at 135° C. The copolymer has excellent cross-linkability, can be cross-linked with a small amount of a peroxide or the like, and a cross-linked rubber composition prepared using this copolymer has excellent heat aging resistance, mechanical strength, weather resistance, and oxone resistance.

38 Claims, No Drawings

ETHYLENIC RANDOM COPOLYMER, PROCESS FOR PREPARING THE SAME, AND RUBBER COMPOSITION

This application is the national phase under 35 U.S.C. §371 of prior PCT International Application No. PCT/JP97/01815 which has an International filing date of May 28, 1997 which designated the United States of America, the entire contents of which are herby incorporated by reference.

TECHNICAL FIELD

The present invention relates to an ethylene/α-olefin/nonconjugated polyene random copolymer and a process for its preparation. More specifically, the invention relates to an ethylene/α-olefin/nonconjugated polyene random copolymer that has excellent workability and crosslinking properties and yields molded articles having excellent mechanical properties and heat resistance, and to a process for preparing such an ethylene random copolymer. The invention further relates to a rubber composition using the ethylene random copolymer.

BACKGROUND ART

Ethylene/α-olefin/nonconjugated polyene random copolymers (hereinafter also simply referred to as ethylene copolymerized rubber) such as ethylene/α-olefin/polyene terpolymer (EPDM) and the like copolymers have been widely used as materials for automobiles, electric wires, construction and civil engineering, and as industrial materials owing to their excellent weatherability, resistance against ozone and thermal aging resistant property.

In recent years, it has been urged to produce ethylene/α-olefin/nonconjugated polyene random copolymers having further improved thermal aging resistance properties and high fluidity (high-speed moldability) for use in the above-mentioned applications.

It has been known that an ethylene/propylene/dicyclopentadiene (DCPD) copolymerized rubber exhibits higher fluidity (higher-speed moldability) than the ethylene/propylene/ethylidenenorbornene (ENB) copolymerized rubbers or the ethylene/propylene/1,4-hexadiene copolymerized rubbers.

It has further been known to greatly increase the thermal aging resistant property by effecting the crosslinking by using an organic peroxide instead of using sulfur which is a generally used curing agent.

Generally, however, the organic peroxide is very expensive compared to sulfur. When the organic peroxide is used in small amounts in order to suppress the cost, the ethylene/propylene/ethylidenenorbornene (ENB) copolymerized rubber, ethylene/propylene/1,4-hexadiene copolymerized rubber and ethylene/propylene/dicyclopentadiene (DCPD) are all loosely crosslinked and exhibit poor mechanical properties.

It has therefore been desired to provide an ethylene/α-olefin/nonconjugated polyene random copolymer which maintains excellent mechanical properties even when the organic peroxide is used in small amounts and exhibits excellent thermal aging resistant property and excellent fluidity (high-speed moldability), as well as to provide a rubber composition thereof and a process for its preparation.

In view of the above-mentioned prior art, the present inventors have conducted keen study concerning an ethylene/α-olefin/nonconjugated polyene random copolymer and a process for its preparation, and have succeeded in producing an ethylene/α-olefin/nonconjugated polyene random copolymer of quite a novel structure.

It is an object of the present invention to provide an ethylene/α-olefin/nonconjugated polyene random copolymer having a novel structure and excellent fluidity, crosslinking property with peroxide, thermal aging resistant property and mechanical properties, that could not be obtained by the traditional preparation methods, and a process for its preparation.

Another object of the present invention is to provide an ethylene random copolymerized rubber composition which has a low tackiness on the surface of the crosslinked product, does not abnormally produce foam in the inside, and yields a crosslinked product having excellent thermal aging resistant property and resistance against permanent strain and, particularly, to provide a rubber composition for hot-air crosslinking.

DISCLOSURE OF THE INVENTION

According to the present invention, there is provided an amorphous or low-crystalline ethylene random copolymer derived from an ethylene (a), an α-olefin (b) having 3 to 20 carbon atoms and a nonconjugated polyene (c) having a norbornene skeleton, and simultaneously satisfying the following requirements (1) to (5):

(1) the molar ratio [(a)/(b)] of the ethylene (a) to the α-olefin (b) is from 40/60 to 95/5;

(2) the amount of the nonconjugated polyene (c) is from 0.5 to 50 (g/100 g) in terms of an iodine value of the copolymer;

(3) the effective network-chain density ν is not smaller than $1.5 \times 10^{20}/cm^3$ when crosslinked under the application of pressure at 170° C. for 10 minutes by using 0.01 mol of a dicumyl peroxide per 100 g of the copolymer;

(4) the effective network-chain density ν and a ratio γ2/γ1 of a shearing rate γ1 of when a shearing stress $0.4 \times 10^6$ dynes/cm² is exhibited to a shearing rate γ2 of when a shearing stress $2.4 \times 10^6$ dynes/cm² is exhibited as found from a melt flow curve at 100° C., establish a relationship represented by the general formula [I], $$0.04 \times 10^{19} \leq \{\log(\gamma 2/\gamma 1)\}/\nu \leq 0.20 \times 10^{19} \qquad [I]$$

and;

(5) an intrinsic viscosity [η] as measured in a decalin at 135° C. is from 0.5 to 10 dl/g.

In the ethylene random copolymer of the present invention, it is desired that (6) the nonconjugated polyene (c) is a norbornene compound represented by the following formula [II],

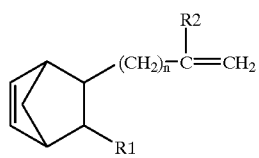

[II]

wherein n is an integer of from 0 to 10, R1 is a hydrogen atom or an alkyl group having 1 to 10 carbon atoms, and R2 is a hydrogen atom or an alkyl group having 1 to 5 carbon atoms, and/or by the following formula [III],

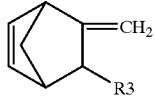

[III]

wherein R3 is a hydrogen atom or an alkyl group having 1 to 10 carbon atoms.

According to the present invention, furthermore, there is provided a process for preparing the above-mentioned ethylene random copolymer, by a copolymerization of the ethylene (a), α-olefin (b) having 3 to 20 carbon atoms and nonconjugated polyene (c) having a norbornene skeleton in the presence of a catalyst, wherein said catalyst comprises:

a soluble vanadium compound represented by the following formula [IV],

[IV]

wherein R is a hydrocarbon group, X is a halogen atom, and $0 \leq n \leq 3$, and an organoaluminum compound represented by the following formula [V],

[V]

wherein R1 is a hydrocarbon group, X1 is a halogen atom, and $0 < m < 3$, and said copolymerization is carried out at a polymerization temperature of from 30 to 60° C. under a polymerization pressure of from 4 to 12 kgf/cm$^2$, while supplying the ethylene and the nonconjugated polyene in amounts (molar ratio) of, $0.01 \leq$ nonconjugated polyene/ethylene $\leq 0.2$.

In the present invention, it is desired that the organoaluminum compound has an Al(Et)$_2$Cl/Al(Et)$_{1.5}$Cl$_{1.5}$ molar ratio (Et is an ethyl group) of from 1/5 to 10/1 and, particularly, from 1/2 to 8/1.

According to the present invention, furthermore, there is provided a rubber composition containing 100 parts by weight of the amorphous or low-crystalline ethylene random copolymer (A) and from 0.05 to 10 parts by weight of the organic peroxide (B), and particularly a rubber composition for hot-air crosslinking.

BEST MODE FOR CARRYING OUT THE INVENTION

The ethylene random copolymer of the present invention is derived from an ethylene (a), an α-olefin (b) having 3 to 20 carbon atoms and a nonconjugated polyene (c) having a norbornene skeleton, and has a feature in that the above-mentioned requirements (1) to (5) are all satisfied simultaneously.

The requirement (1) specifies a composition ratio of ethylene (a)/α-olefin (b) in the copolymer. When this composition ratio is within the above-mentioned range, the workability, rubber properties and weatherability can be maintained on satisfactory levels.

The requirement (2) specifies, in terms of an iodine value, the amount of unsaturated bonds in the copolymer due to the nonconjugated polyene (c). When this value is smaller than the above-mentioned range, the copolymer is elongated excessively resulting in an increase in the permanent deformation factor, which is not desirable (see Comparative Example 8 appearing later). When this value is too large, on the other hand, resistance against the environment is deteriorated and further giving disadvantage from the standpoint of cost.

The requirement (3) indicates the easiness of crosslinking the copolymer with a peroxide or the degree of crosslinking that is accomplished in terms of an effective network-chain density ν (measuring method will be described later) under predetermined crosslinking conditions. When this value is smaller than $1.5 \times 10^{20}$/cm$^3$, the copolymer is elongated excessively resulting in an increase in the permanent deformation factor, which is not desirable (see Comparative Examples 7 to 9 appearing later).

The requirement (4) represents balance between the dependency of the shearing rate in the melt-fluidized state upon the shearing stress and the crosslinking property. When the shearing rate is denoted by γ and the shearing stress by σ, the melt viscosity η is expressed as $\eta = \sigma/\gamma$. On a melt flow curve described by plotting a relationship between the shearing stress and the shearing rate of the polymer, the shearing rate very greatly increases with an increase in the shearing stress. Referring to a term at the center of the formula (I), the numerator which is a logarithmic value of the shearing rate ratio γ2/γ1 increases with an increase in the dependency of the shearing rate upon the shearing stress when the copolymer is melt-fluidized, and decreases with a decrease in the dependency of the shearing rate upon the shearing stress. Symbol ν in the denominator represents the effective network-chain density in the above-mentioned requirement (3). It is important that the ratio of the above two characteristic values lies within a range of the formula (I) from the standpoint of maintaining the thermal aging resistant property at an excellent level while maintaining the workability and mechanical properties of the copolymer at excellent levels. When this ratio becomes smaller than 0.04, the workability tends to decrease. When this ratio exceeds 0.2, on the other hand, the strength is lost, permanent strain increases and thermal aging resistant property is deteriorated.

The above-mentioned requirement (5) specifies the molecular weight of the copolymer. When the intrinsic viscosity [η] is lower than the above-mentioned range, physical properties such as mechanical properties tend to be deteriorated. When the intrinsic viscosity [η] is larger than the above-mentioned range, on the other hand, workability and the like properties tend to be deteriorated.

The above-mentioned requirement (6) is to limit the nonconjugated polyenes used for the copolymer of the present invention to the norbornene compounds having chemical structures of the above-mentioned formulas [II] and [III]. A variety of cyclic nonconjugated polyenes have been known such as those having a norbornene skeleton and those having a dicyclopentadiene skeleton. When a 5-ethylidene-2-norbornene (ENB) or a dicyclopentadiene (DCPD) is used, however, it is difficult to obtain a copolymer of which the effective network-chain density (ν) lies in a range specified by the requirement (3) despite the iodine value of the copolymer is within the range of the present invention. Such a copolymer exhibits large permanent strain and exhibits very poor thermal aging resistant property (see Comparative Examples 1 to 5 appearing later).

When a 5-methylene-2-norbornene (MND) or a 5-vinyl-2-norbornene (VND) is used, on the other hand, it is allowed to prepare a rubber having an effective network-chain density of $2 \times 10^{20}/cm^3$ upon effecting the crosslinking with a peroxide. This rubber has a small permanent strain and exhibits very excellent thermal aging resistant property (see Examples 1 to 7 appearing later). This is because, the copolymer derived from the norbornene compounds of chemical structures of the above-mentioned formulas [II] and [III] is crosslinked with a peroxide at an increased rate despite the iodine value is the same, i.e., despite the copolymer has the same amount of unsaturated bonds.

This is attributed to be as described below. That is, when the nonconjugated polyene is copolymerized, one ethylenically unsaturated bond takes part in the copolymerization and the remaining ethylenically unsaturated bonds remain in the copolymer chain. In the case of a cyclic nonconjugated polyene, however, the remaining ethylenically unsaturated bonds may stay inside the ring and outside the ring. It is considered that the ethylenically unsaturated bonds outside the ring have a larger degree of freedom than those of the ethylenically unsaturated bonds inside the ring, and are rich in reactivity. In the copolymer prepared by the polymerization means of the present invention by using norbornene compounds of chemical structures of the above-mentioned formulas [II] and [III], it is considered that the ethylenically unsaturated bonds are present at an increased proportion outside the ring offering the above-mentioned advantage.

The copolymer of the present invention is prepared by copolymerizing the ethylene (a), α-olefin (b) having 3 to 20 carbon atoms and nonconjugated polyene (c) having a norbornene skeleton in amounts as described above. In this case, the copolymerization is carried out by using a catalyst comprising a soluble vanadium compound of the above-mentioned formula [IV] and an organoaluminum compound of the above-mentioned formula [V], at a polymerization temperature of from 30 to 60° C. under a polymerization pressure of from 4 to 12 kgf/cm² and supplying the ethylene and the nonconjugated polyene in amounts (molar ratio) of, 0.0≦nonconjugated polyene/ethylene≦0.2, in order to prepare a copolymer satisfying all of the above-mentioned requirements (1) to (5) simultaneously.

In the present invention, it is desired that the organoaluminum compound has an $Al(Et)_2Cl/Al(Et)_{1.5}Cl_{1.5}$ molar ratio of from 1/5 to 10/1 and, particularly, from 1/2 to 8/1. It is further desired that the soluble vanadium compound is $VOCl_3$. When these conditions are satisfied, it is made possible to obtain a copolymer having xylene-insoluble components of not larger than 1%, which is advantageous.

[Random Copolymer]

The ethylene random copolymer of the present invention is derived from an ethylene (a), an α-olefin (b) having 3 to 20 carbon atoms and a nonconjugated polyene (c) having a norbornene skeleton, and has the molar ratio [(a)/(b)] of the ethylene (a) to the α-olefin (b) of from 40/60 to 95/5 and the amount of the nonconjugated polyene (c) of from 0.5 to 50 (g/100 g) in terms of an iodine value of the copolymer.

In the random copolymer of the present invention, the α-olefin (b) has 3 to 20 carbon atoms, such as propylene, butene-1, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, nonadecene-1, eicosene-1, 9-methyl-decene-1, 11-methyl-dodecene-1, 12-ethyl-tetradecene-1, etc. These α-olefins are used in a single kind or in a combination of two or more kinds.

Among them, it is desired to use an α-olefin having 3 to 10 carbon atoms and, particularly, to use propylene, 1-butene, 1-hexene and 1-octene.

The nonconjugated polyene (c) used in the present invention has a norbornene skeleton. It is desired to use a norbornene compound represented by the above-mentioned general formula [II] or [III].

As the alkyl group R1 of the above-mentioned general formula [II], there can be exemplified methyl group, ethyl group, propyl group, isopropyl group, n-butyl group, isobutyl group, sec-butyl group, t-butyl group, n-pentyl group, isopentyl group, t-pentyl group, neopentyl group, hexyl group, isohexyl group, heptyl group, octyl group, nonyl group and decyl group.

Concrete examples of the alkyl group R2 in the above-mentioned general formula [II] are those alkyl groups represented by R1 but having 1 to 5 carbon atoms.

Concrete examples of the alkyl group R3 in the above-mentioned general formula [III] will be those alkyl groups which are the same as the alkyl groups represented by R1.

Concrete examples of the norbornene compound represented by the above-mentioned general formula [II] or by the above-mentioned general formula [III] include 5-methylene-2-norbornene, 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl)-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl), 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, and 5-(1,2,3-trimethyl-4-pentenyl)-2-norbornene.

Among them, it is desired to use 5-vinyl-2-norbornene, 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene and 5-(7-octenyl)-2-norbornene.

In addition to the 5-vinyl-2-norbornene, there can be used, being mixed together, the following nonconjugated polyenes in such amounts that they will not impair the desired properties.

Concrete examples include chain-like nonconjugated dienes such as 1,4-hexadiene; 3-methyl-1, 4-hexadiene, 4-methyl-1, 4-hexadiene, 5-methyl-1, 4-hexadiene, 4,5-dimethyl-1, 4-hexadiene, and 7-methyl-1, 6-octadiene; cyclic nonconjugated dienes such as methyltetrahydroindene, 5-ethylidene-2-norbornene, 5-methylene-2-norbornene, 5-isopropylidene-2-norbornene, 5-vinylidene-2-norbornene, and 6-chloromethyl-5-isopropenyl-2-norbornene; and trienes such as 2,3-diisopropylidene-5-norbornene, 2-ethylidene-3-isopropylidene-5-norbornene, and 2-propenyl-2, 2-norbornadiene.

Ratio of Ethylene (a)/α-olefin (b)

The ethylene/α-olefin/nonconjugated polyene random copolymer provided by the present invention contains units derived from the ethylene (a) and the units derived from the α-olefin (b) having 3 to 20 carbon atoms (hereinafter often referred to simply as α-olefin) at a molar ratio [(a)/(b)] of from 40/60 to 95/5, preferably, from 50/50 to 90/10, more preferably, from 55/45 to 85/15, and particularly preferably, from 60/40 to 80/20.

Iodine Value

The iodine value of the ethylene/α-olefin/nonconjugated polyene random copolymer used in the present invention is from 0.5 to 50 (g/100 g), preferably, from 0.8 to 40 (g/100 g), more preferably, from 1 to 30 (g/100 g) and, particularly preferably, from 1.5 to 20 (g/100 g).

When this value is smaller than the above-mentioned range, the crosslinking efficiency becomes small. When this value becomes too great, resistance against the environment is deteriorated and the cost is driven up, which is not desirable.

Intrinsic Viscosity

It is desired to use the ethylene/α-olefin/nonconjugated polyene random copolymerized rubber having an intrinsic viscosity [η] of from 0.5 to 10 dl/g and, preferably, from 0.88 dl/g as measured in a decalin heated at 135° C. from the standpoint of satisfying both physical properties and workability.

Molecular Weight Distribution

The ethylene/α-olefin/nonconjugated polyene random copolymerized rubber has a molecular weight distribution (Mw/Mn) of from 3 to 50, preferably, from 3.3 to 40 and, more preferably, from 3.5 to 30. The copolymerized rubber having a molecular weight over the above-mentioned range exhibits excellent physical properties and workability in combination.

Crosslinking Density

The ethylene/α-olefin/nonconjugated polyene random copolymer of the present invention is highly densely crosslinked with a peroxide. When 100 g of the random copolymer is press-cured with 0.01 mol of dicumyl peroxide at 170° C. for 10 minutes, the copolymerized rubber has an effective network-chain density ν of not smaller than $1.5\times10^{20}/cm^3$, preferably not smaller than $1.8\times10^{20}/cm^3$ and, more preferably, not smaller than $2.0\times10^{20}/cm^3$.

Balance Between the Crosslinking Density and the Melt Fluidity Log (γ2/γ1)/ν

The quotient [log (γ2/γ1)/ν] is from $0.04\times10^{19}$ to $0.20\times10^{-19}$, preferably, from $0.042\times10^{-19}$ to $0.19\times10^{-19}$ and, more preferably, from $0.050\times10^{-19}$ to $0.18\times10^{-19}$, as found by dividing, by the effective network-chain density ν, the logarithmic value of a ratio γ2/γ1 of the shearing rate γ1 of when $0.4\times10^6$ dynes/cm² is exhibited to the shearing rate γ2 of when $2.4\times10^6$ dynes/cm² is exhibited of the ethylene/α-olefin/nonconjugated polyene random copolymerized rubber as found from a melt flow curve at 100° C.

The ethylene/α-olefin/nonconjugated polyene random copolymer may be modified wloth a polar monomer. The modified product will be described later in detail.

[Process for Preparing a Copolymer]

According to the present invention, the above-mentioned particular ethylene/α-olefin/nonconjugated polyene random copolymer is obtained by copolymerizing the ethylene (a), α-olefin (b) having 3 to 20 carbon atoms and nonconjugated polyene (c) having a norbornene skeleton in a manner that the molar ratio [(a)/(b)] of the ethylene (a) to the α-olefin (b) is from 40/60 to 95/5 and that the content of the nonconjugated polyene (c) is from 0.5 to 50 (g/100 g) in terms of the iodine value of the copolymer, by using a catalyst which contains as chief components:

a soluble vanadium compound represented by the following formula [IV], $$VO(OR)_nX_{3-n} \quad [IV]$$

wherein R is a hydrocarbon group, X is a halogen atom, and 0≦n≦3, or a vanadium compound represented by VX₄, and an organoaluminum compound represented by the following formula [V], $$R^1{}_mAlX^1{}_{3-n} \quad [V]$$

wherein R1 is a hydrocarbon group, X1 is a halogen atom, and 0≦m≦3, at a polymerization temperature of from 30 to 60° C. and, particularly, from 30 to 59° C. under a polymerization pressure of from 4 to 12 kgf/cm² and, particularly, from 5 to 8 kgf/cm², and by supplying the ethylene and the nonconjugated polyene in amounts (molar ratio) of, 0.01≦nonconjugated polyene/ethylene≦0.2.

It is desired to carry out the polymerization in a hydrocarbon medium.

In the copolymerization reaction, the soluble vanadium compound used as a component for constituting the catalyst is soluble in a hydrocarbon medium in the polymerization reaction system. Concretely speaking, it is a vanadium compound represented by the general formula $VO(OR)_nX_b$ or $V(OR)_cX_d$ (wherein R is a hydrocarbon group, 0≦n≦3, 0≦b≦3, 2≦n+b≦3, 0≦c≦4, 0≦d≦4, 3≦c+d≦4) or an electron donating adduct thereof.

More concretely, there can be exemplified $VOCl_3$, $VO(OC_2H_5)Cl_2$, $VO(OC_2H_5)_2Cl$, $VO(O\text{-iso-}C_3H_{7[<reset]})Cl_2$, $VO(O\text{-n-}(C_4H_9)Cl_2$, $VO(OC_2H_5)_3$, $VOBr_3$, $VCl_4$ $VO(O\text{-n-}C_4H_9)_3$, and $VCl_3$. Among them, $VOCl_3$ is preferably used.

As the organoaluminum compound catalyst component used for the copolymerization reaction, there can be used a compound having at least one Al-carbon bond in the molecule, e.g., (i) an organoaluminum compound represented by the general formula, $$R^1{}_mAl(OR^2)nHpXq$$

wherein R1 and R2 may be the same or different and are hydrocarbon groups, usually, having 1 to 15 carbon atoms and, preferably, 1 to 4 carbon atoms, X is a halogen, 0≦m≦3, 0≦n≦3, 0≦p≦3, 0≦q≦3, and m+n+p+q=3, and (ii) a co-alkylated product of a metal of the Group I and aluminum represented by the general formula, $$M^1AlR^1$$

wherein $M^1$ is Li, Na or K, and $R^1$ is as defined above.

As the above-mentioned organoaluminum compound (i), there can be exemplified those represented by the general formula, $$R^1{}_mAl(OR^3)_{3-m}$$

wherein R1 and R2 are as defined above, and m is preferably 1.5≦m≦3, those represented by the general formula, $$R^1{}_mAlX_{3-m}$$

wherein R1 is as defined above, X is a halogen atom and m is preferably 0<m<3, those represented by the general formula, $$R^1{}_mAlH_{3-m}$$

wherein R1 is as defined above, and m is preferably 2≦m≦3, and those represented by the general formula, $$R^1{}_mAl(OR^2)_nXq$$

wherein R1 and R2 are as defined above, X is a halogen atom, $0 \leq m \leq 3$, $0 \leq n < 3$, $0 \leq q < 3$, And m+n+q=3.

More concrete examples of the aluminum compound (i) include trialkylaluminum such as triethylaluminum, tributyl aluminum and triisopropylaluminum; dialkylaluminum alkoxides such as diethylaluminum ethoxide and dibutylaluminum butoxide; alkylaluminum sesquialkoxides such as ethylaluminum sesquiethoxide and butylaluminum sesquibutoxide; as well as partly alkoxylated alkylaluminum having an average composition expressed by $R^1{}_{0.5}Al(OR^1)_{0.5}$; partly halogenated alkylaluminum including dialkylaluminum halides such as diethylaluminum chloride, dibutylaluminum chloride, and diethylaluminum bromide, alkylaluminum sesquihalide such as ethylaluminum sesquichloride, butylaluminum sesquichloride and ethylaluminum sesquibromide, alkylaluminum dihalide such as ethylaluminum dichloride, propylaluminum dichloride and butylalminum dibromide; partly hydrogenated alkylaluminum including dialkylaluminum hydrides such as diethylaluminum hydride and dibutylaluminum hydride, alkylaluminum dihydrides such as ethylaluminum dihydride, propylaluminum dihydride; and partly alkoxylated and halogenated alkylaluminum such as ethylaluminumethoxy chloride, butylaluminumbutoxy chloride and ethylaluminumethoxy bromide.

In the present invention, it is desired to use the organoaluminum compound of a blended system having an composition of $Al(Et)_2Cl/Al(Et)_{1.5}Cl_{1.5}$, this molar ratio may be from 1/5 to 10/1 and, particularly, from 1/2 to 8/1. When the blended system is used in combination with $VOCl_3$, there is obtained a polymer having xylene-insoluble components of not larger than 1%.

As a compound resembling those of (i), there can be used an organoaluminum compound to which are bonded two or more aluminum atoms via an oxygen atom or a nitrogen atom. Examples of such a compound will be $(C_2H_5)_2AlOAl(C_2H_5)_2$, $(C_4H_5)_2AlOAl(C_4H_2)_2$, and $(C_4H_9)_2AlNAl(C_4H_9)_2$
$C_6H_5$ As the compounds (ii), there can be exemplified $LiAl(C_2H_5)_4$ and $LiAl(C_7H_{15})_4$. Among them, it is particularly desired to use an alkylaluminum halide, an alkylaluminum dihalide or a mixture thereof.

The copolymerization reaction can be carried out in a hydrocarbon medium. As the hydrocarbon medium, there can be exemplified aliphatic hydrocarbons such as hexane, heptane, octane and kerosene; alicyclic hydrocarbons such as cyclohexane and methylcyclohexane; aromatic hydrocarbons such as benzene, toluene and xylene; and the polymerizable unsaturated hydrocarbon. Two or more kinds of them may be used being mixed together.

In the method of preparing the ethylene random copolymer of the present invention, the copolymerization reaction is continuously carried out. In this case, the concentration of the soluble vanadium compound supplied to the polymerization reaction system is not larger than 10 times, preferably from 7 to 1 time, more preferably, from 5 to 1 time, and Darticularly preferably, from 3 to 1 time of the concentration of the soluble vanadium compound in the polymerization reaction system.

The ratio (Al/V) of the vanadium atoms to the aluminum atoms in the polymerization reaction system is not smaller than 2, preferably, from 2 to 50 and, particularly preferably, from 3 to 20. The soluble vanadium compound and the organoaluminum compound are usually supplied being diluted with a hydrocarbon medium.

It is, here, desired that the soluble vanadium compound is diluted to lie within the above-mentioned range of concentration. There is employed a method of supplying the organoaluminum compound into the polymerization reaction system by adjusting its concentration, for example, to not larger than 50 times as great as the concentration of the organoaluminum compound in the polymerization reaction system.

The concentration, as vanadium atoms, of the soluble vanadium compound in the copolymerization reaction system is, usually, from 0.01 to 5 gram atoms/liter and, preferably, from 0.05 to 3 gram atoms/liter.

The copolymerization reaction is carried out at a temperature of from 30 to 60° C. and, particularly, from 30 to 50° C. The copolymerization reaction is usually carried out continuously. In this case, the ethylene, α-olefin and norbornene-type polyene compound which are the starting materials of polymerization, soluble vanadium compound and organoaluminum compound which are the catalyst components, and hydrocarbon medium, are continuously supplied to the polymerization reaction system, and the polymerization reaction mixture is continuously released from the polymerization reaction system.

The average residence time in the copolymerization reaction is usually from 5 minutes to 5 hours and, preferably, from 10 minutes to 3 hours though it may vary depending upon the kind of the starting materials the concentration of the catalyst components and the temperature.

During the copolymerization reaction, the pressure is usually maintained to be from 4 to 12 $kgf/cm^2$ and, particularly, from 5 to 8 $kgf/cm^2$. Depending upon the cases, inert gas such as nitrogen or argon may be made present. In order to adjust the molecular weight of the copolymer, furthermore, a molecular weight-adjusting agent such as hydrogen may be made present.

The ethylene and the α-olefin are supplied to the copolymerization reaction, usually, at a molar ratio of from about 20/80 to about 80/20 though it may vary depending upon the polymerization conditions. It is, on the other hand, desired to supply the ethylene and the nonconjugated polyene in amounts (molar ratio) of $0.01 \leq$ nonconjugated polyene/ethylene $\leq 0.2$. The rate of supplying the starting olefin is so controlled that the ratios of components in the ethylene random copolymer to be produced will constitute the composition of the ethylene random copolymer contemplated by the present invention. The copolymerization reaction is carried out until the intrinsic viscosity of the formed ethylene random copolymer reaches a intrinsic viscosity specified by the present invention.

The copolymer solution obtained by the copolymerization reaction is a hydrocarbon medium solution of the ethylene random copolymer. The concentration of the ethylene random copolymer contained in the formed copolymer solution is, usually, from 2.0 to 20.0% by weight and, preferably, from 2.0 to 10.0% by weight. The ethylene random copolymer of the present invention is obtained by treating the formed copolymer solution according to a customary method.

[Modified Random Copolymer]

In the present invention, the above-mentioned ethylene/α-olefin/nonconjugated polyene random copolymer may be graft-modified with a polar monomer.

As the polar monomer, there can be exemplified a hydroxyl group-containing ethylenically unsaturated compound, an amino group-containing ethylenically unsaturated compound, an epoxy group-containing ethylenically unsaturated compound, an aromatic vinyl compound, an unsaturated carboxylic acid or a derivative thereof, a vinyl ester compound and a vinyl chloride.

Examples of the hydroxyl group-containing ethylenically unsaturated compound include (meth)acrylic esters such as hydroxyethyl(meth)acrylate, 2-hydroxypropyl(meth) acrylate, 3-hydroxypropyl(meth)acrylate, 2-hydroxy-3-phenoxy-propyl(meth)acrylate, 3-chloro-2-hydroxypropyl (meth)acrylate, glycerinmono(meth)acrylate, pentaerithritolmono(meth)acrylate, trimethylolpropanemono(meth)acrylate, tetramethylolethanemono(meth)acrylate, butanediolmono (meth)acrylate, polyethyleneglycolmono(meth)acrylate, and 2-(6-hydroxyhexanoyloxy)ethyl acrylate, as well as 10-undecene-1-ol, 1-octene-3-ol, 2-methanol norbornene, hydroxystyrene, hydroxyethylvinyl ether, hydroxybutylvinyl ether, α-methylolacrylamide, 2-(meth)acryloyloxyethyl acid phosphate, glycerin monoallyl ether, allyl alcohol, allyloxy ethanol, 2-butene-1, 4-diol and glycerin monoalcohol.

As the amino group-containing ethylenically unsaturated compound, there can be exemplified a vinyl monomer having at least one amino group or a substituted amino group represented by the following formula,

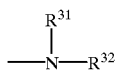

wherein R31 is a hydrogen atom, a methyl group or an ethyl group, R32 is a hydrogen atom, an alkyl group having 1 to 12 carbon atoms and, preferably, from 1 to 8 carbon atoms or a cycloalkyl group having 6 to 12 carbon atoms and, preferably, from 6 to 8 carbon atoms, and wherein the alkyl group or the cycloalkyl group may further have a substituent.

Examples of the amino group-containing ethylenically unsaturated compound include alkyl ester derivatives of acrylic acid or methacrylic acid, such as aminoethyl (meth) acrylate, propylaminoethyl (meth)acrylate, dimethylaminoethyl methacrylate, aminopropyl (meth)acrylate, phenylaminoethyl methacrylate, and cyclohexylaminoethyl methacrylate; vinylamine derivatives such as N-vinyldiethylamine and N-acetylvinylamine; allylamine derivatives such as allylamine, methacrylamine, N-methylacrylamine, N,N-dimethylacrylamide, and N,N-dimethylaminopropylacrylamide; acrylamide derivatives such as acrylamide and N-methylacrylamide; aminostyrenes such as p-aminostyrene; imide 6-aminohexylsuccinate and imide 2-aminoethylsuccinate.

As the epoxy group-containing ethylenically unsaturated compound, there is used a monomer having a polymerizable unsaturated bond and at least one epoxy group in one molecule.

Examples of the epoxy group-containing ethylenically unsaturated compound include glycidyl acrylate, glycidyl methacrylate; mono and diglycidyl esters of dicarboxylic acid (alkyl group has 1 to 12 carbon atoms in the case of a monoglycidyl ester) such as mono and diglycidyl esters of maleic acid; mono and diglycidyl esters of fumaric acid, mono and diglycidyl esters of crotonic acid; mono and diglycidyl esters of tetrahydrophthalic acid; mono and glycidyl esters of itaconic acid; mono and diglycidyl esters of butenetricarboxylic acid; mono and diglycidyl esters of citraconic acid; mono and diglycidyl esters of end-cis-bicyclo[2,2,1]hepto 5-en-2,3-dicarboxylic acid (nazic acid™); mono and diglycidyl esters of end-cis-bicyclo[2,2,1]hepto-5-en-2-methyl-2,3-dicarboxylic acid (methyl nazic acid™); and mono and diglycidyl esters of allylsuccinic acid; as well as alkylglycidyl ester of p-styrenecarboxylic acid, allylglycidyl ether, 2-methylallylglycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

The aromatic vinyl compound is represented by the following formula,

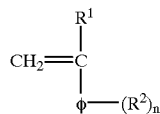

wherein ø is a benzene ring or heterocyclic ring, R1 is a hydrogen atom or an alkyl group having 1 to 3 carbon atoms, such as methyl group, ethyl group, propyl group or isopropyl group, R2 is a hydrocarbon group having 1 to 3 carbon atoms or a halogen atom, such as methyl group, ethyl group, propyl group, isopropyl group, chlorine atom, bromine atom or iodine atom, and n is an integer of, usually, from 0 to 5 and, preferably, from 1 to 5.

As the aromatic vinyl compound, there can be used, for example, styrene, α-methylstyrene, o-methylstyrene, p-methylstyrene, m-methylstyrene, p-chlorostyrene, m-chlorostyrene, p-chloromethylstyrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

As the unsaturated carboxylic acids, there can be exemplified acrylic acid, methacrylic acid, maleic acid, fumaric acid, tetrahydrophthalic acid, itaconic acid, citraconic acid, corotonic acid, isocrotonic acid, norbornenedicarboxylic acid and bicyclo[2,2,1]hepto-2-en-5,6-dicarboxylic acid or derivatives thereof (such as acid anhydride, acid halide, amide, imide, ester, etc.).

As the derivatives, there can be exemplified malenyl chloride, malenylimide, maleic anhydride, itaconic anhydride, citraconic anhydride, tetrahydrophthalic anhydride, bicyclo[2,2,1]hepto-2-en-5,6-dicarboxylic anhydride, dimethyl maleate, monomethyl maleate, ethyl maleate, diethyl fumarate, dimethyl itaconate, diethyl citraconate, dimethyl tetrahydrophthalate, dimethyl bicyclo [2,2,1]hepto-2-en-5,6-dicarboxylate, hydroxyethyl(meth) acrylate, hydroxypropyl(meth)acrylate, glycidyl(meth) acrylate, aminoethyl methacrylate and aminopropyl methacrylate.

Among them, it is desired to use (meth)acrylic acid, maleic anhydride, hydroxyethyl(meth)acrylate, glycidyl methacrylate and aminopropyl methacrylate.

Examples of the vinyl ester compound include vinyl acetate, vinyl propionate, vinyl n-butyrate, vinyl isobutyrate, vinyl pivalate, vinyl caproate, vinyl verthatate, vinyl laurate, vinyl stearate, vinyl benzoate, vinyl p-t-butylbenzoate, vinyl salicylate, and vinyl cyclohexanecarboxylate.

[Preparation of Modified Random Copolymer]

A modified random copolymer is obtained by graft-polymerizing the above-mentioned random copolymer with a polar monomer.

The random copolymer is graft-polymerized with the polar monomer in an amount of, usually, from 1 to 100 parts by weight and, preferably, from 5 to 80 parts by weight per 100 parts by weight of the random copolymer.

The graft-polymerization is usually carried out in the presence of a radical initiator.

As the radical initiator, there can be used an organic peroxide or an azo compound.

Examples of the organic peroxide include dicumyl peroxide, di-t-butyl peroxide, 2,5-dimethyl-2,5-bis(t-butylperoxy)hexane, 2,5-dimethyl-2,5-bis(t-butylperoxy) hexyne-3, 1,3-bis(t-butylperoxyisopropyl)benzene, 1,1-bis (t-butylperoxy)valerate, benzoyl peroxide, t-butylperoxybenzoate, acetyl peroxide, isobutyl peroxide, octanoyl peroxide, decanoyl peroxide, lauroyl peroxide, 3,3,5-trimethylhexanoyl peroxide, 2,4-dichlorobenzoyl peroxide and m-toluyl peroxide.

Examples of the azo compound include azoisobutylonitrile and dimethylazoisobutylonitrile.

It is desired that the radical initiator is used in an amount of from about 0.001 to 10 parts by weight per 100 parts by weight of the random copolymer.

The radical initiator can be used being mixed together with the random copolymer and the polar monomer, but can also be used being dissolved in a small amount of an organic solvent. The organic solvent can be used without any particular limitation provided it is capable of dissolving the radical initiator, and will be aromatic hydrocarbon solvents such as benzene, toluene and xylene; aliphatic hydrocarbon solvents such as pentane, hexane, heptane, octane, nonane and decane; alicyclic hydrocarbon solvents such as cyclohexane, methyl cyclohexane and decahydronaphthalene; chlorinated hydrocarbons such as chlorobenzene, dichlorobenzene, trichlorobenzene, methylene chloride, chloroform, carbon tetrachloride and tetrachloroethylene; alcohol solvents such as methanol, ethanol, n-propynol, iso-propanol, n-butanol, sec-butanol and tert-butanol; ketone solvents such as acetone, methyl ethyl ketone and methyl isobutyl ketone; ester solvents such as ethyl acetate and dimethyl phthalate; and ether solvents such as dimethyl ether, diethyl ether, di-n-amyl ether, tetrahydrofurane and dioxyanisole.

It is also allowable to use a reducing material at the time of graft-polymerizing the random copolymer with a polar monomer. The reducing material helps increase the grafting amount of the polar monomer.

Examples of the reducing material include iron (II) ions, chromium ions, cobalt ions, nickel ions, palladium ions, sulfite, hydroxyamine, hydrazine, as well as compounds having such groups as —SH, $SO_3H$, —$NHNH_2$ and —COCH(OH)—.

Concrete examples of the reducing material include ferrous chloride, potassium bichromate, cobalt chloride, cobalt naphthenate, palladium chloride, ethanolamine, diethanolamine, N,N-dimethylaniline, hydrazine, ethyl mercaptan, benzenesulfonic acid and p-toluenesulfonic acid.

In the present invention, the reducing material can be used usually in an amount of from 0.001 to 5 parts by weight and, preferably, from 0.1 to 3 parts by weight per 100 parts by weight of the random copolymer.

The random copolymer is graft-modified with the polar monomer according to a customary method by, for example, dissolving the random copolymer in an organic solvent, adding the polar monomer and the radical initiator to the solution, and conducting the reaction at a temperature of from 70 to 200° C. and, preferably, from 80 to 190° C. for a period of from 0.5 to 15 hours and, preferably, from 1 to 10 hours.

There is no particular limitation on the organic solvent provided it is capable of dissolving the random copolymer. There can be used, for example, aromatic hydrocarbon solvents such as benzene, toluene and xylene, and aliphatic hydrocarbon solvents such as pentane, hexane and heptane.

It is also allowable to prepare the modified random copolymer by reacting the random copolymer with the polar monomer without solvent by using an extruder.

It is desired that this reaction is carried out at a temperature of, usually, not lower than a melting point of the random copolymer and, concretely, at 120 to 250° C. for a period of, usually, from 0.5 to 10 minutes.

It is desired that the modified amount (grafted amount of the polar monomer) of the thus obtained modified random copolymer is, usually, from 0.1 to 50% by weight and, preferably, from 0.2 to 30% by weight.

[Curable Rubber Composition]

The ethylene/α-olefin/polyene random copolymer of the present invention can be used in an uncured form but exhibits further improved properties when it is used in the form of a cured product.

The copolymer of the present invention can be cured by heating with a curing agent or by irradiating electron rays without using curing agent.

The ethylene/α-olefin/polyene random copolymer of the present invention may contain other components depending upon the object. It is desired that the rubber composition contains the ethylene/α-olefin/polyene copolymer in an amount of not smaller than 20% by weight and, preferably, not smaller than 25% by weight with respect to the whole rubber composition.

As the other components, there can be exemplified a reinforcing agent, inorganic filler, softening agent, antioxidant (stabilizer), working assistant, as well as a compound constituting a foaming system such as foaming agent or foaming assistant, plasticizer, coloring agent and other rubber blending agent. The kinds and amounts of the other components are suitably selected depending upon the applications. Among them, it is particularly desired to use a reinforcing agent, inorganic filler and softening agent, which will now be concretely described.

[Reinforcing Agent and Inorganic Filler]

Concrete examples of the reinforcing agent include carbon blacks such as SRF, GPF, FEF, MAF, HAF, ISAF, SAF, FT and MT, those obtained by treating the surfaces of these carbon blacks with a silane coupling agent, silica, activated calcium carbonate, fine powdery talc and fine powdery silicate.

Concrete examples of the inorganic filler include light calcium carbonate, heavy calcium carbonate, talc and clay.

The rubber composition may contain the reinforcing agent and/or the inorganic filler in an amount of from 10 to 200 parts by weight and, preferably, from 10 to 180 parts by weight per 100 parts by weight of the ethylene/α-olefin/polyene copolymer (A).

A cured rubber having improved mechanical properties such as tensile strength, tearing strength and abrasion resistance is obtained from the rubber composition containing the reinforcing agent in such an amount.

By blending the inorganic filler in such amounts, it is possible to heighten the hardness of the curred rubber without deteriorating other properties and to lower the cost.

[Softening Agent]

As a softening agent, any softening agent can be used that has heretofore been used for the rubbers. Concrete examples include petroleum softening agents such as process oil, lubricating oil, paraffin, fluidized paraffin, petroleum asphalt and vaseline; coal tar softening agents such as coal tar and coal tar pitch; fatty oil softening agents such as castor oil, linseed oil, rape oil and coconut oil; waxes such as tall oil, factice, bees wax, carnauba wax and lanolin; fatty acids and fatty acid salts such as ricinoleic acid, palmitic acid, barium stearate, calcium stearate and zinc laurate; and synthetic high molecular materials such as petroleum resin, atactic polypropylene and cumarone-indene resin.

Among them, it is desired to use petroleum softening agents and, particularly, a process oil.

The rubber composition may contain the above-mentioned softening agent in an amount of from 10 to 200 parts by weight, preferably, from 10 to 150 parts by weight and, particularly preferably, from 10 to 100 parts by weight per 100 parts by weight of the ethylene/α-olefin/polyene copolymer (A).

[Antioxidant]

The rubber or the rubber composition exhibits excellent heat resistance and durability without using an antioxidant, but exhibits extended life when the antioxidant is used like that of the ordinary rubbers. The antioxidant used in this case will be amine antioxidant, phenolic antioxidant or sulfur antioxidant.

Concrete examples of the amine antioxidant include naphthylamine antioxidant such as phenyl-α-naphthylamine and phenyl-β-naphthylamine; diphenylamine antioxidant such as p-(p-toluene.sulfonylamide)-diphenylamine, 4,4-(α,α-dimethylbenzyl)diphenylamine, 4,4'-dioctyl.diphenylamine, a high-temperature reaction product of diphenylamine and acetone, a low-temperature reaction product of diphenylamine and acetone, a low-temperature reaction product of diphenylamine, aniline and acetone, a reaction product of diphenylamine and diisobutylene, octylated diphenylamine, dioctylated diphenylamine, p,p'-dioctyl.diphenylamine, and alkylated diphenylamine; and p-phenylenediamine antioxidant such as N,N'-diphenyl-p-phenylenediamine, n-propyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-(1,3-dimethylbutyl)-N'-phenyl-p-phenylenediamine, phenyl hexyl-p-phenylenediamine, and phenyl octyl-p-phenylenediamine.

Concrete examples of the phenolic antioxidant include styrenated phenol, 2,6-di-t-butyl-4-methylphenol, 2,6-di-t-butyl-p-ethylphenol, 2,4,6-tri-t-butylphenol, butylhydroxyanisole, 1-hydroxy-3-methyl-4-isopropylbenzene, mono-t-butyl-p-cresol, mono-t-butyl-m-cresol, 2,4-dimethyl-6-t-butylphenol, butylated bisphenol A, 2,2'-methylene-bis-(4-methyl-6-t-butylphenol), 2,2'-methylene-bis(4-ethyl-6-t-butylphenol), 2,2'-methylene-bis(4-methyl-6-t-nonylphenyl), 2,2'-isobutylidene-bis-(4,6-dimethylphenol), 4,4'-butylidene-bis(3-methyl-6-t-butylphenol), 4,4'-methylene-bis-(2,6-di-t-butylphenol), 2,2-thio-bis-(4-methyl-6-t-butylphenol), 4,4'-thio-bis-(3-methyl-6-t-butylphenol), 4,4'-thio-bis(2-methyl-6-butylphenol), 4,4'-thio-bis(6-t-butyl-3-methylphenol), bis(3-methyl-4-hydroxy-5-t-butylbenzene)sulfide, 2,2-thio [diethyl-bis-3-(3,5-di-t-butyl-4-hydroxyphenol)propionate], bis[3,3-bis(4'-hydroxy-3'-t-butylphenol)butylic acid]glycol ester, bis[2-(2-hydroxy-5-methyl-3-t-butylbenzene)-4-methyl-6-t-butylphenyl]terephthalate, 1,3,5-tris(3',5'-di-t-butyl-4'-hydroxybenzyl)isocyanulate, N,N'-hexamethylene-bis(3,5-di-t-butyl-4-hydroxy-hydroxyamide), N-octadecyl-3-(4'-hydroxy-3',5'-di-t-butylphenol)propionate, tetrakis [methylene-(3',5'-di-t-butyl-4-hydroxyphenyl)propionate] methane, 1,1'-bis(4-hydroxyphenyl)cyclohexane, mono(α-methylbenzene)phenol, di(α-methylbenzyl)phenol, tri(α-methylbenzyl)phenol, bis(2'-hydroxy-3'-t-butyl-5'-methylbenzyl) 4-methyl-phenol, 2,5-di-t-amylhydroquinone, 2,6-di-butyl-α-dimethylamino-p-cresol, 2,5-di-t-butylhydroquinone, diethylester of 3,5-di-t-butyl-4-hydroxybenzylphosphoric acid, catechol and hydroquinone.

Concrete examples of the sulfur antioxidant include 2-mercaptobenzimidazole, zinc salt of 2-mercaptobenzimidazole, 2-mercaptomethylbenzimidazole, zinc salt of 2-mercaptomethylbenzimidazole, zinc salt of 2-mercaptomethylimidazole, dimyristylthiodipropionate, dilaurylthiodipropionate, distearylthiodipropionate, ditridecylthiodipropionate and pentaerithritol-tetrakis-(β-lauryl-thiopropionate).

These antioxidants can be used in a single kind or in a combination of two or more kinds.

The antioxidants are blended in an amount of, usually, from 0.1 to 10 parts by weight and, preferably, from 0.5 to 5 parts by weight per 100 parts by weight of the ethylene/ (α-olefin/nonconjugated polyene copolymerized rubber (A).

[Working Assistant]

As the working assistant, there can be used those that are usually used for the rubbers. Concrete examples include acids such as ricinoleic acid, stearic acid, palmitic acid and lauric acid, salts of these higher fatty acids such as barium stearate, zinc stearate, calcium stearates or esters.

The working assistant is used in an amount of not larger than 10 parts by weight and, preferably, not larger than 5 parts by weight per 100 parts by weight of the ethylene/α-olefin/polyene copolymer.

[Curing Agent]

The rubber composition that is to be cured by heating is usually blended with a compound that constitutes the curing system such as curing agent, curing promotor or curing assistant.

As the curing agent, there can be used sulfur, sulfur compound and organic peroxide. Among them, it is desired to use an organic peroxide which is a curing agent exhibiting excellent thermal aging resistant property.

There is no particular limitation in the form of sulfur; i.e., it can be used as powdery sulfur, precipitated sulfur, colloidal sulfur, surface-treated sulfur or insoluble sulfur.

Concrete examples of the sulfur compound include sulfur chloride, sulfur dichloride, high molecular polysulfide, morpholine disulfide, alkylphenol disulfide, tetramethylthiuram disulfide and selenium dimethyldithiocarbamate.

Concrete examples of the organic peroxide include dialkyl peroxides such as dicumyl peroxide, di-t-butyl peroxide, di-t-butyl peroxy-3,3,5-trimethylcyclohexane, t-butylcumyl peroxide, di-t-amyl peroxide, t-butyl hydroperoxide, 2,5-dimethyl-2,5-di(t-butylperoxy)hexyne-3, 2,5-dimethyl-2,5-di(benzoylperoxy)hexane, 2,5-dimethyl-2,5-mono(t-butylperoxy)hexane, and α,α'-bis(t-butylperoxy-m-isopropyl)benzene; peroxy esters such as t-butylperoxy acetate, t-butylperoxy isobutylate, t-butylperoxy pivalate, t-butylperoxy maleate, t-butylperoxyneo decanoate, t-butylperoxy benzoate, di-t-butylperoxy phthalate, and 1,1-bis-t-butylperoxy-3,3,5-trimethylcyclohexane; ketone peroxides such as dicyclohexanone peroxide, etc.; and a mixture thereof.

Among them, it is desired to use organic peroxides of which the temperature for imparting a half-life of one minute is from 130 to 200° C. and, particularly, to use such organic peroxides as dicumyl peroxide, di-t-butyl peroxide, di-t-butylperoxy-3,3,5-trimethylcyclohexane, t-butylcumyl peroxide, di-t-amyl peroxide, t-butylhydro peroxide, 2,5-dimethyl-2,5-di(t-butylperoxy)hexyne-3, 2,5-dimethyl-2,5-mono(t-butylperoxy)hexane, and 1,1-bis-t-butylperoxy-3,3, 5-tri-methylcyclohexane.

It is desired that the curing agent, when it is sulfur or a sulfur compound, is used in an amount of from 0.1 to 10 parts by weight and, preferably, from 0.5 to 5 parts by weight per 100 parts by weight of the ethylene/α-olefin/polyene copolymer (A), and is used, when it is an organic peroxide, in an amount of from 0.001 to 0.05 mols and, preferably, from 0.002 to 0.02 mols per 100 g of the ethylene/α-olefin/polyene copolymer (A)

[Curing Promotor]

When sulfur or a sulfur compound is used as a curing agent, it is desired to use a curing promotor in combination.

Concrete examples of the curing promotor include sulfenamide compounds such as N-cyclohexyl-2-benzthiazole sulfenamide, N-oxydiethylene-2-benzthiazole sulfenamide, and N,N-diisopropyl-2-benzthiazole sulfenamide; thiazole compounds such as 2-mercaptobenzothiazole, 2(2,4-dinitrophenyl)mercaptobenzothiazole, 2-(2,6-diethyl-4-morpholinothio)benzothiazole, dibenzothiazyl disulfide, and 2-(4'-morpholinodithio)benzothiazole; guanidine compounds such as diphenylguanidine, triphenylguanidine, diorthonitrylguanidine, orthonitrylbiguanide and diphenylguanidine phthalate; aldehyde-amine or aldehyde-ammonia compounds such as acetaldehyde-aniline reaction product, butylaldehyde-aniline condensation product, hexamethylenetetramine, and acetaldehyde ammonia; imidazoline compounds such as 2-mercaptoimidazoline (ethylenethiourea) and the like; thiourea compounds such as thiocarbanilide, diethylthiourea, dibutylthiourea, trimethylthiourea and diorthotolylthiourea; thiuram compounds such as tetramethylthiuram monosulfide, tetramethylthiuram disulfide, tetraethylthiuram disulfide, tetrabutylthiuram disulfide, pentamethylenethiuram tetrasulfide; dithioic acid salt compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthate compounds such as zinc dibutylxanthogenate, etc.; and zinc flower.

The above-mentioned curing promotor is used in an amount of from 0.1 to 20 parts by weight and, preferably, from 0.2 to 10 parts by weight per 100 parts by weight of the ethylene/α-olefin/polyene copolymer (A).

[Curing Assistant (Polyfunctional Monomer)]

When an organic peroxide is used as the curing agent, it is desired to use a curing assistant (polyfunctional monomer) in an amount of from 0.5 to 2 moles and, preferably, in an equal molar amount per mol of the organic peroxide.

Concrete examples of the curing assistant include sulfur; quinone dioxime compounds such as p-quinone dioxime; (meth)acrylate compounds such as trimethylolpropane triacrylate, ethyleneglycol dimethacrylate and polyethyleneglycol dimethacrylate; allyl compounds such as diallyl phthalate and triallyl cyanurate; maleimide compounds such as m-phenylenebismaleimide; and divinyl benzene.

[Foaming Agent]

The rubber composition may form foams when it contains a compound that constitutes a foaming system, such as foaming agent, forming assistant or the like agent.

As the foaming agent, there can be used those that are usually used for foaming the rubbers. Concrete examples include inorganic forming agents such as sodium bicarbonate, sodium carbonate, ammonium bicarbonate, ammonium carbonate, and ammonium nitrite; nitroso compounds such as N,N'-dimethyl-N,N'-dinitrosoterephthalamide and N,N'-dinitrosopentamethylenetetramine; azo compounds such as azodicarbonamide, azobisisobutylonitrile, azocyclohexylnitrile, azodiaminobenzene and barium azodicarboxylate; sulfonylhydrazide compound such as benzenesulfonyl hydrazide, toluenesulfonyl hydrazide, p,p'-oxybis (benzenesulfonyl hydrazide), and diphenylsulfone-3,3'-disulfonyl hydrazide; azide compounds such as calcium azide, 4,4-diphenyldisulfonyl azide and p-toluenesolfonyl azide.

Among them, it is desired to use nitroso compound, azo compound and azide compound.

The foaming agent can be used in an amount of from 0.5 to 30 parts by weight and, preferably, from 1 to 20 parts by weight per 100 parts by weight of the ethylene/α-olefin/polyene copolymer. The rubber composition containing the foaming agent in such amounts makes it possible to prepare a foamed product having an apparent specific gravity of from 0.03 to 0.8 g/cm$^3$.

The foaming assistant may be used together with the foaming agent. Use of the foaming assistant makes it possible to lower the decomposition temperature of the foaming agent, to promote the decomposition and to uniformalize the foams. The foaming assistant will be such organic acids as salicylic acid, phthalic acid, stearic acid and oxalic acid, as well as urea or derivatives thereof.

The foaming assistant can be used in an amount of from 0.01 to 10 parts by weight and, preferably, from 0.1 to 5 parts by weight per 100 parts by weight of the ethylene/α-olefin/polyene copolymer.

[Other Rubbers]

The rubber composition according to the present invention can be used being blended together with any other known rubber in a range in which the object of the invention is not hindered.

Examples of other rubbers include isoprene rubbers such as natural rubber (NR), isoprene rubber (IR), etc.; and conjugated diene rubbers such as butadiene rubber (BR), styrene-butadiene rubber (SBR), acrylonitrile-butadiene rubber (NBR), and chloroprene rubber (CR); and silicone rubber.

When the crosslinking is effected with an organic peroxide, in particular, it is desired to blend the rubber composition with rubbers having high crosslinking efficiencies such as BR, SBR and silicone rubber.

It is also allowable to use a conventional ethylene/α-olefin copolymerized rubber, such as ethylene/propylene random copolymer (EPR), and ethylene/α-olefin/polyene copolymer such as EPDM other than the above-mentioned ethylene/α-olefin/polyene copolymer.

When blended with a styrene resin (PS) or an acrylonitrile/styrene resin (AS) in an attempt to improve the shock resistance, furthermore, advantages are obtained such as higher graft efficiency than that of the existing EPT and easy grafting. Even when they are used as starting materials of TPO, furthermore, the organic peroxide exhibits higher efficiency than that of the existing EPT.

The curable rubber composition of the present invention can be prepared by a method-of preparing a general rubber blend by using the ethylene/α-olefin/polyene copolymer and the above-mentioned other components. By using an internal mixer such as Bumbury's mixer, kneader or intermix, the ethylene/α-olefin/polyene copolymer and other components are kneaded at a temperature of 80 to 170° C. for 3 to 10 minutes and, as required, a curing agent, a curing promotor or a curing assistant is added thereto. The mixture is then kneaded by using rolls such as open rolls or a kneader at a roll temperature of 40 to 80° C. for 5 to 30 minutes to prepare the rubber composition. Thus, there is obtained the rubber composition (blended rubber) which is usually in the form of a ribbon or a sheet. When the kneading is effected by the internal mixer at a low temperature, there can be also kneaded a curing agent, a curing promotor and a foaming agent, etc.

[Cured Rubber]

A cured product (cured rubber) of the rubber composition of the present invention is usually obtained by premolding the uncured rubber composition by a molding method using a molding machine such as extrusion molding machine, calender roll, press machine, injection molding machine or transfer molding machine, heating the rubber composition at the time of molding or introducing the molded article into a curing vessel to heat it, or irradiating the molded article with electron rays to cure it.

When the rubber composition is to be cured by heating, it is desired to effect the heating at 150 to 270° C. for 1 to 30 minutes by using a heating vessel of the type of, for example, glass beads fluidized bed, UHF (ultrahigh frequency electromagnetic waves), steam, or LCM (hot-molten salt bath).

When the rubber composition is to be cured upon the irradiation with electron rays without using curing agent, the premolded rubber composition is irradiated with electron rays having energy of from 0.1 to 10 MeV and, preferably, from 0.3 to 2 MeV, such that the dose of absorption is from 0.5 to 35 Mrad and, preferably, from 0.5 to 10 Mrad.

The molding and curing can be effected by using, or not using, a mold.

When the mold is not used, the rubber composition is, usually, molded and cured continuously.

The thus molded and cured rubber can be used as automotive industrial parts such as weather strips, running channel for door glasses, window frame, radiator hoses, brake parts, wiper blades and the like; rubber articles for industrial use such as rubber roll, belt, packing, hoses and the like; electric insulating materials such as anode cap, grommet and the like; articles for civil engineering and construction, such as covering material for electric wires, gasket for construction, sheet for civil engineering; and rubber sheet.

The cured and foamed article obtained by heating and foaming the rubber blend containing a foaming agent, can be used as heat insulating material, cushioning material, sealing material and the like materials.

EFFECTS OF THE INVENTION

According to a process for preparing an ethylene/α-olefin/norbornene type nonconjugated polyene random copolymer of the present invention, it is allowed to prepare an ethylene/α-olefin/nonconjugated polyene random copolymer having excellent crosslinking property with a peroxide, fluidity, thermal aging resistant property, and excellent mechanical properties.

The process for preparing an ethylene/α-olefin/norbornene type nonconjugated polyene random copolymer of the present invention makes it possible to efficiently prepare an ethylene/α-olefin/norbornene type nonconjugated polyene random copolymer.

Besides, the ethylene/α-olefin norbornene type nonconjugated polyene random copolymer of the present invention exhibits excellent crosslinking property, and is capable of effectively forming crosslinking with a small amount of peroxide. The crosslinked rubber composition exhibits excellent thermal aging resistant property, mechanical strength, weatherability and resistance against ozone.

EXAMPLES

Excellent effects of the present invention will now be described by way of Examples to which only, however, the invention is in no way limited.

In the following Examples, the measurements were taken as described below.

[Composition]

The composition of the copolymer was measured by a $^{13}$C-NMR method.

[Iodine Value]

Found according to a titration method.

[Intrinsic Viscosity]

The intrinsic viscosity [η] was measured in a decalin heated at 135° C.

[Molecular Weight Distribution]

Expressed as a ratio (weight average molecular weight Mw/number average molecular weight Mn) found according to GPC by using GMH-HT, GMH-HTL manufactured by Toso Co. as the column and orthodichlorobenzene as the solvent.

[γ2/γ1]

A melt flow curve was found at 100° C. in order to find a ratio of the shearing rate γ1 of when a shearing stress $0.4 \times 10^6$ dynes/cm$^2$ is exhibited to the shearing rate γ2 of when a shearing stress $2.4 \times 10^6$ dynes/cm$^2$ is exhibited.

[Effective Network-chain Density]

Immersed in toluene at 37° C. for 72 hours according to JIS K 6258 (1993), and the effective network-chain density was calculated according to Flory-Rehner's formula.

$$\nu \,(\text{number}/\,\text{cm}^3) = \frac{\nu_R + \ln(1 - \nu_R) + \mu \nu_R^2}{-V_0 \left(\nu_R^{1/3} - \nu_R / 2\right)}$$

$\nu_R$: volume percentage of pure rubber relative to the volume of pure rubber in the cured rubber that is swollen (volume of pure rubber + volume of absorbed solvent), $\mu$: interaction constant (0.49) of between rubber-solvent, $V_0$: molecular volume of the solvent, $\nu$ (number/ cm$^3$): Effective network-chain density, number of the effective network-chains in 1 cm$^3$ of pure rubber.

Preparation of a Sample

To 100 g of the random copolymer was added 0.01 mol of dicumyl peroxide, and the mixture was kneaded at 50° C. in the following manner.

Kneading Method

Kneading was effected by using a standard kneading roller for testing, 150×330 mm (type 6×13), specified under SRIS 2603 (standard kneading roller for rubbers).

The temperature of the rollers was set to be 50±2° C., the gap between the rolls was adjusted to be 0.5 mm, the rubber was wound on the high-speed side, and 3/4 switch-over was effected right and left alternatingly each one time. The required time was 1.0 minute.

Then, 0.01 mol of the dicumyl peroxide was added, and 3/4 switch-over was effected right and left alternatingly each three times. The 3/4 switch-over stands for that the rubber is cut by three-fourths of the roll width and is cut with a knife until the heap on the roll is no longer seen.

This operation was effected right and left alternatingly for every 30 seconds. The required time was 13.0 minutes A batch was cut from the rolls and the rounding was effected 6 times while maintaining a gap of about 0.5 mm between the rolls. The required time was 12.0.

The mass of the batch was measured. A change in the mass must not be larger than ±1% of the total mass.

A sheet having a final thickness of about 2.2 mm was taken out for being cured.

By using a 100-ton pressing machine; the obtained sample was press-cured at 170° C. for 10 minutes to obtain a sample for measurement.

[Relationship Between γ2/γ1 and the Crosslinking Density]

Log (γ2/γ1)/ν was found by calculation.

[Residual Cumulative Percentage after Extracted with Xylene]

As a pretreatment, about 5 g of the sample was sandwitched between the luminer to prepare a 0.5 mm-thick sheet by using a hand press heated at 160±5° C. The sheet was cut in an amount of 1 to 2 g, and was cut into a size of 1 mm squares.

A stainless steel cage was weighed and its weight was denoted by A. The sample was picked in an amount of 1±0.1 g onto the stainless cage and was weighed (weight in this case was denoted by B).

Zeolite and 200 ml of xylene were introduced into a 300-ml flat-bottom flask.

Cooling water for a condenser was circulated and nitrogen for sealing was supplied.

The Soxhlet's extractor was set to start refluxing. The refluxing rate was 4 to 6 minutes, and the extraction was effected for 5 hours.

After the refluxing, the sample was taken out, xylene was substituted with n-heptane and acetone of normal temperature, and the sample was dried at 105° C. for one hour under reduced pressure. After left to cool for one hour, the sample was weighed. Weight at this moment was denoted by C. The calculation was in compliance with the following formula.

$$\text{Residual cumulative percentage with xylene} = \frac{C-B}{B-A} \times 100(\%)$$

A first decimal place was regarded to be the measured value.

Example 1

By using a stainless steel polymerization vessel having a volume of 100 liters equipped with stirrer vanes (stirring rotational speed=250 rpm), the ethylene/propylene/5-vinyl-2-norbornene were continuously tercopolymerized. From the side portion of the polymerization vessel to the liquid phase were continuously supplied hexane at a rate of 60 liters, ethylene at a rate of 3.7 kg, propylene at a rate of 8.8 kg, 5-vinyl-2-norbornene at a rate of 320 g, hydrogen at a rate of 40 liters, (a) VOCl$_3$ at a rate of 32 mmols and (b) Al(Et)$_2$Cl at a rate of 160 mmols as a catalyst, and Al(Et)$_{1.5}$Cl$_{1.5}$ at a rate of 32 mmols all per hour.

The copolymerization reaction was carried out at 40° C.

Upon carrying out the copolymerization reaction under the above-mentioned conditions, there was obtained an ethylene/propylene/5-vinyl-2-norbornene copolymer in the form of a homogeneous solution.

The polymerization reaction was terminated by adding a small amount of methanol into the polymer solution that was continuously extracted from the lower portion of the polymerization vessel, and the polymer was isolated from the solvent by the steam stripping, followed by drying in vacuum at 55° C. for 48 hours.

The copolymer contained ethylene in an amount of 74 mol %, possessed a limiting viscosity [η] of 1.89 dl/g, and contained 5-vinyl-2-norbornene in an amount of 7.5 in terms of iodine value. The copolymer possessed a ratio γ2/γ1 of 115.8 as found from a melt flow curve, possessed an effective network-chain density ν of 29.7×10$^{19}$/cm$^3$, and log (γ2/γ1)/ν was 0.069×10$^{-19}$.

Examples 2 to 9 and Comparative Examples 1 to 8

In Example 1, the polymerization conditions were changed as shown in Table 3 to obtain copolymers having dissimilar properties. The obtained copolymers were evaluated in the same manner as in Example 1. The polymerization conditions and the copolymers were as shown in Table 3.

Example 10

First, the blending agents shown in Table 1 were kneaded by using the Bumburies's mixer of a content of 1.7 liters at a temperature of 140 to 150° C. for 5 minutes to obtain a blend (1).

TABLE 1

| Blending agent | | Blended amount (pts by wt.) |
|---|---|---|
| EPT rubber (component A) | *1 | 100 |
| Zinc flower | *2 | 5 |
| Stearic acid | *3 | 1 |
| HAF carbon black | *4 | 50 |
| Softening agent | *5 | 10 |
| Activating agent | *6 | 1 |
| Hindered phenol type antioxidant | *7 | 2 |
| Sulfer type antioxidant | *8 | 4 |

*1: Ethylene/propylene/5-vinyl-2-norbornene copolymer rubber (1)
Copolmerized rubber of Example 1.
Ethylene/propylene molar ratio = 74/26.
Intrinsic viscosity [η] = 1.89 dl/g as measured in a decalin heated at 135° C.
Iodine value = 7.5.
*2: Manufactured by Sakai Kagaku Kogyo Co.
*3: Tsubaki (trade name) manufactured by Nippon Yushi Co.
*4: Asahi #70 (trade name) manufactured by Asahi Carbon Co.
*5: Dyana Process Oil PW380 (trade name) manufactured by Idemitsu Kosan Co.
*6: Polyethylene glycol, molecular weight = 4000.
*7: Irganox 1010 (trade name) manufactured by Chiba Geigy Co.
*8: Nokrac MB (trade name) manufactured by Ouchi Shinko Kagaku Kogyo Co.

Next, the above blend (1) was wound on 8-inch open rolls (manufactured by Nippon Roll Co.), the blending agents were added on the open rolls so that the blending recipe was as shown in Table 2, the mixture was kneaded for 3 minutes, and was then put to the sheet-forming process to obtain a sheet having a thickness of 3 mm. The temperatures on the surfaces of the rolls were 50° C. on the front roll and 60° C. on the rear roll.

TABLE 2

| Blending agent | | Blended amount (pts by wt.) |
|---|---|---|
| Blend (1) | | 173 |
| Organic peroxide (component B) | *9 | 7.0 |
| Crosslinking assistant | *10 | 4.0 |

*9: Mitsui DCP-40C (trade name) manufactured by Mitsui Sekiyu Kagaku Kogyo Co. (dicumyl peroxide, concentration: 40%).
*10: Sanester EG (trade name) manufactured by Sanshin Kagaku Co.

By using a press-molding machine (manufactured by Kotaki Seiki Co.), the thus obtained blend (2) was heated in a mold maintained at 170° C. for 20 minutes to obtain a 2 mm-thick cured sheet which was then measured for its modulus, tensile properties, crosslinking density and aging resistant property. Measurements were taken as described below.

(1) Modulus

Tensile testing was conducted under the conditions of a measuring temperature of 25° C. and a tension speed of 500 mm/min in compliance with JIS K 6301 to measure a modulus $M_{50}$ of when the cured sheet was elongated by 50%.

(2) Tensile Characteristics

The tensile testing was conducted in compliance with JIS K 6301 under the conditions of a measuring temperature of 25° C. and a tension speed of 500 mm/min to measure the elongation $E_B$ at breakage, strength $T_B$ and hardness $H_A$ of the cured sheet.

(3) Effective Network-chain Density (Index of Crosslinking Density)

A cured sheet was immersed in toluene maintained at 37° C. in compliance with JIS K 6301, and the effective network-chain density was calculated from the following formula, $$\nu \,(\text{number}/\text{cm}^3) = \frac{\nu_R + \ln(1 - \nu_R) + \mu \nu_R^2}{-V_0(\nu_R^{1/3} - \nu_R/2)}$$

$\nu_R$: volume percentage of pure rubber relative to the volume of pure rubber in the cured rubber that is swollen (volume of pure rubber + volume of absorbed solvent), $\mu$: interaction constant (0.49) of between rubber-solvent.

$V_0$: molecular volume of the solvent, $\nu$ (number/ cm$^3$): Effective network-chain density, number of the effective network-chains in 1 cm$^3$ of pure rubber.

(4) Compressive Permanent Strain

Compressive permanent strain Cs was found in compliance with JIS by using a sample cured at 170° C. for 25 minutes under a condition of 100-ton electric press.

(5) Aging Properties

The cured sheet was aged in an oven heated at 175° C. for 168 hours and was put to the tension testing at a temperature of 25° C. and a tension speed of 500 mm/min in compliance with JIS K 6301 in order to measure the elongation at breakage and strength of the cured sheet and to calculate the tensile strength retaining factor $A_R(T_B)$ and the elongation retaining factor $A_R(E_B)$. A change $A_H$ in the hardness was also found.

(6) Moldability (a) Roll Workability

The kneaded product kneaded according to the above-mentioned method was left to stand at room temperature for 24 hours. By using 8-inch open rolls heated at a temperature of 50° C. maintaining a gap of 5 mm, 1.5 kg of the kneaded product was observed for its manner of being wound up on the rolls and was evaluated for its roll workability in five steps.

[Five-step Evaluation]

5—A rubber band is in complete contact with the rolls and is smoothly rotating.

4—The band often separates away from the surfaces of the rolls between the vertex of the rolls and the bank.

3—The band separates away from the surfaces of the rolls between the vertex of the roll and the bank.

2—The band fails to adhere to the surfaces of the rolls and cannot be roll-worked unless it is held by hand.

1—The band quite fails to adhere to the surfaces of the rolls and hangs down, and cannot be roll-worked unless it is held by hand.

(b) Extrusion Workability

The kneaded product kneaded according to the above-mentioned method was left to stand at room temperature for 24 hours. The kneaded product was extruded under the below-mentioned conditions by using a 50-mm extruder, and the extruded skin was evaluated in five steps as an index of extrusion workability.

[Extrusion Conditions]

L/D=14, 50-mm extruder, modify/garbe die was used.

Extrusion temperature: rear part of cylinder/front part of cylinder/head=60° C./70° C./80° C.

[Five-step Evaluation]

5—The surface is smooth exhibiting good luster.

4—The surface is almost smooth but exhibits no luster.

3—The surface is slightly rugged and exhibits no luster.

2—The surface is rugged and exhibits no luster.

1—The surface is rugged to a large degree and exhibits no luster.

The results were as shown in Table 3.

Example 11

The procedure was carried out in the same manner as in Example 10 but using the below-mentioned ethylne/propylene/5-vinyl-2-norbornene copolymerized rubber (Example 2) instead of using the ethylne/propylene/5-vinyl-2-norbornene copolymerized rubber (1) of Example 1.

Ethylene/propylene/5-vinyl-2-norbornene copolymerized rubber (Example 2):

Ethylene/propylene (molar ratio)=75/25.

Intrinsic viscosity [η]=1.83 dl/g as measured in a decalin heated at 135° C.

Iodine value=10.9.

The results were as shown in Table 4.

Example 12

The procedure was carried out in the same manner as in Example 10 but using the below-mentioned ethylene/propylene/5-vinyl-2-norbornene copolymerized rubber (Example 3) instead of using the ethylene/propylene/5-vinyl-2-norbornene copolymerized rubber (1) of Example 1.

Ethylene/propylene/5-vinyl-2-norbornene copolymerized rubber (Example 3):

Ethylene/propylene (molar ratio)=74/26.

Intrinsic viscosity [η]=1.75 dl/g as measured in a decalin heated at 135° C.

Iodine value=18.4.

The results were as shown in Table 4.

Example 13

The procedure was carried out in the same manner as in Example 10 but using the below-mentioned ethylene/1-butene/5-vinyl-2-norbornene copolymerized rubber (Example 4) instead of using the ethylene/propylene/5-vinyl-2-norbornene copolymerized rubber (1) of Example 1.

Ethylene/1-butene/5-vinyl-2-norbornene copolymerized rubber (Example 4):

Ethylene/1-butene (molar ratio)=81/19.

Intrinsic viscosity [η]=2.62 dl/g as measured in a decalin heated at 135° C.

Iodine value=5.4.

The results were as shown in Table 4.

Example 14

The procedure was carried out in the same manner as in Example 10 but using the below-mentioned ethylene/propylene/5-vinyl-2-norbornene copolymerized rubber (Example 5) instead of using the ethylene/propylene/5-vinyl-2-norbornene copolymerized rubber (1) of Example 1.

Ethylene/propylene/5-vinyl-2-norbornene copolymerized rubber (Example 5):

Ethylene/propylene (molar ratio)=75/25.

Intrinsic viscosity [η]=2.01 dl/g as measured in a decalin heated at 135° C.

Iodine value=8.0.

The results were as shown in Table 4.

Example 15

The procedure was carried out in the same manner as in Example 10 but using the below-mentioned ethylene/propylene/5-vinyl-2-norbornene copolymerized rubber (Example 6) instead of using the ethylene/propylene/5-vinyl-2-norbornene copolymerized rubber (1) of Example 1.

Ethylene/propylene/5-vinyl-2-norbornene copolymerized rubber (Example 6):

Ethylene/propylene (molar ratio)=75/25.

Intrinsic viscosity [η]2.81 dl/g as measured in a decalin heated at 135° C.

Iodine value=8.5.

The results were as shown in Table 4.

Example 16

The procedure was carried out in the same manner as in Example 10 but using the below-mentioned ethylene/propylene/5-vinyl-2-norbornene copolymerized rubber (Example 7) instead of using the ethylene/propylene/5-vinyl-2-norbornene copolymerized rubber (1) of Example 1.

Ethylene/propylene/5-vinyl-2-norbornene copolymerized rubber (Example 7):

Ethylene/propylene (molar ratio)=74/26.

Intrinsic viscosity [η]=1.95 dl/g as measured in a decalin heated at 135° C.

Iodine value=7.8.

The results were as shown in Table 4.

Comparative Example 9

The procedure was carried out in the same manner as in Example 10 but using the below-mentioned ethylene/propylene/DCPD copolymerized rubber (Comparative Example 1) instead of using the ethylene/propylene/5-vinyl-2-norbornene copolymerized rubber (1) of Example 1.

Ethylene/propylene/DCPD copolymerized rubber (Comparative Example 1):

Ethylene/propylene (molar ratio)=66/34.

Intrinsic viscosity [η]=1.85 dl/g as measured in a decalin heated at 135° C.

Iodine value=12.0.

The results were as shown in Table 4.

Comparative Example 10

The procedure was carried out in the same manner as in Example 10 but using the below-mentioned ethylene/propylene/ENB copolymerized rubber (Comparative Example 2) instead of using the ethylene/propylene/5-vinyl-2-norbornene copolymerized rubber (1) of Example 1.

Ethylene/propylene/ENB copolymerized rubber (Comparative Example 2):

Ethylene/propylene (molar ratio)=66/34.

Intrinsic viscosity [η]=1.98 dl/g as measured in a decalin heated at 135° C.

Iodine value=13.0.

The results were as shown in Table 4.

Comparative Example 11

The procedure was carried out in the same manner as in Example 10 but using the below-mentioned ethylene/1-butene/DCPD copolymerized rubber (Comparative Example 3) instead of using the ethylene/propylene/5-vinyl-2-norbornene copolymerized rubber (1) of Example 1.

Ethylene/1-butene/DCPD copolymerized rubber (Comparative Example 3):

Ethylene/1-butene (molar ratio)=89/11.

Intrinsic viscosity [η]=1.2 dl/g as measured in a decalin heated at 135° C.

Iodine value=10.0.

The results were as shown in Table 4.

Comparative Example 12

The procedure was carried out in the same manner as in Example 10 but using the below-mentioned ethylene/propylene/5-ethylidene-2-norbornene copolymerized rubber (Comparative Example 4) instead of using the ethylene/propylene/5-vinyl-2-norbornene copolymerized rubber (1) of Example 1.

Ethylene/propylene/5-ethylidene-2-norbornene copolymerized rubber (Comparative Example 4):

Ethylene/propylene (molar ratio)=66/34.

Intrinsic viscosity [η]=2.73 dl/g as measured in a decalin heated at 135° C.

Iodine value=22.0.

The results were as shown in Table 4.

Comparative Example 13

The procedure was carried out in the same manner as in Example 10 but using the below-mentioned ethylene/propylene/DCPD copolymerized rubber (Comparative Example 5) instead of using the ethylene/propylene/5-vinyl-2-norbornene copolymerized rubber (1) of Example 1.

Ethylene/propylene/DCPD copolymerized rubber (Comparative Example 5):

Ethylene/propylene (molar ratio)=67/33.

Intrinsic viscosity [η]=2.02 dl/g as measured in a decalin heated at 135° C.

Iodine value=10.0.

The results were as shown in Table 4.

Comparative Example 14

The procedure was carried out in the same manner as in Example 10 but using the below-mentioned ethylene/propylene/5-ethylidene-2-norbornene copolymerized rubber (Comparative Example 6) instead of using the ethylene/propylene/5-vinyl-2-norbornene copolymerized rubber (1) of Example 1.

Ethylene/propylene/5-ethylidene-2-norbornene copolymerized rubber (Comparative Example 6):

Ethylene/propylene (molar ratio)=79/21.

Intrinsic viscosity [η]=2.62 dl/g as measured in a decalin heated at 135° C.

Iodine value=11.2.

The results were as shown in Table 4.

Comparative Example 15

The procedure was carried out in the same manner as in Example 10 but using the below-mentioned ethylene/propylene/5-vinyl-2-norbornene copolymerized rubber (Comparative Example 7) instead of using the ethylene/propylene/5-vinyl-2-norbornene copolymerized rubber (1) of Example 1.

Ethylene/propylene/5-vinyl-2-norbornene copolymerized rubber (Comparative Example 7):

Ethylene/propylene (molar ratio)=59/41.

Intrinsic viscosity [η]=2.64 dl/g as measured in a decalin heated at 135° C.

Iodine value=2.6.

The results were as shown in Table 4.

Comparative Example 16

The procedure was carried out in the same manner as in Example 10 but using the below-mentioned ethylene/propylene/5-vinyl-2-norbornene copolymerized rubber (Comparative Example 8) instead of using the ethylene/propylene/5-vinyl-2-norbornene copolymerized rubber (1) of Example 1.

Ethylene/propylene/5-vinyl-2-norbornene copolymerized rubber (Comparative Example 8):

Ethylene/propylene (molar ratio)=74/26.

Intrinsic viscosity [η]=2.26 dl/g as measuredin a decalin heated at 135° C.

Iodine value=0.3.

The results were as shown in Table 4.

Example 17

The procedure was carried out in the same manner as in Example 10 but using the below-mentioned ethylene/propylene/5-vinyl-2-norbornene copolymerized rubber (Example 8) instead of using the ethylene/propylene/5-vinyl-2-norbornene copolymerized rubber (1) of Example 1.

Ethylene/propylene/5-vinyl-2-norbornene copolymerized rubber (Example 8):

Ethylene/propylene (molar ratio)=74/26.

Intrinsic viscosity [η]=1.97 dl/g as measured in a decalin heated at 135° C.

Iodine value=3.1.

The results were as shown in Table 4.

Example 18

The procedure was carried out in the same manner as in Example 10 but using the below-mentioned ethylene/propylene/5-vinyl-2-norbornene copolymerized rubber (Example 9) instead of using the ethylene/propylene/5-vinyl-2-norbornene copolymerized rubber (1) of Example 1.

Ethylene/propylene/5-vinyl-2-norbornene copolymerized rubber (Example 9):

Ethylene/propylene (molar ratio)=75/25.

Intrinsic viscosity [η]=1.86 dl/g as measured in a decalin heated at 135° C.

Iodine value=3.8.

The results were as shown in Table 4.

TABLE 3

| | Catalyst | Al/V | $Al(Et)_2CL/$ $Al(Et)_{1.5}$ $Cl_{1.5}$ | Polymerization temp(° C.) | Polymerization pressure (kgf/cm²) | Rate of feeding catalyst (mM/h) | Norbornene compound | Rate of feeding norbornene compound (g/h) |
|---|---|---|---|---|---|---|---|---|
| Ex. No. | | | | | | | | |
| 1 | $VOCl_3$—$Al(Et)_2Cl/Al(Et)_{1.5}Cl_{1.5}$ | 6 | 5/1 | 40 | 6.8 | 32 | VNB | 320 |
| 2 | $VOCl_3$—$Al(Et)_2Cl/Al(Et)_{1.5}Cl_{1.5}$ | 6 | 5/1 | 40 | 6.5 | 48 | VNB | 480 |
| 3 | $VOCl_3$—$Al(Et)_2Cl/Al(Et)_{1.5}Cl_{1.5}$ | 6 | 5/1 | 40 | 7.0 | 74 | VNB | 800 |
| 4 | $VOCl_3$—$Al(Et)_{1.5}Cl_{1.5}$ | 6 | — | 35 | 4.9 | 14 | VNB | 280 |
| 5 | $VO(OEt)Cl_2$—$Al(Et)_{1.5}Cl_{1.5}$ | 7 | — | 40 | 5.5 | 38 | VNB | 380 |
| 6 | $VO(OEt)Cl_2$—$Al(Et)_{1.5}Cl_{1.5}$ | 7 | — | 40 | 5.5 | 40 | VNB | 400 |
| 7 | $VOCl_3$—$Al(Et)_2Cl/Al(Et)_{1.5}Cl_{1.5}$ | 6 | 5/1 | 40 | 6.8 | 33 | MND | 310 |
| 8 | $VOCl_3$—$Al(Et)_2Cl/Al(Et)_{1.5}Cl_{1.5}$ | 6 | 5/1 | 40 | 6.8 | 18 | VNB | 120 |
| 9 | $VO(OEt)Cl_2$—$Al(Et)_{1.5}Cl_{1.5}$ | 6 | — | 40 | 3.2 | 40 | VNB | 380 |
| Comp. Ex. No. | | | | | | | | |
| 1 | $VOCl_3$—$Al(Et)_2Cl/Al(Et)_{1.5}Cl_{1.5}$ | 6 | 7/2 | 45 | 6.3 | 75 | DCPD | 480 |
| 2 | $VOCl_3$—$Al(Et)_2Cl/Al(Et)_{1.5}Cl_{1.5}$ | 6 | 5/1 | 45 | 6.5 | 65 | ENB | 350 |
| 3 | $VO(OEt)Cl_2$—$Al(Et)_{1.5}Cl_{1.5}$ | 8 | — | 60 | 5.0 | 50 | DPCD | 400 |

TABLE 3-continued

| | | | | | | | | | |
|---|---|---|---|---|---|---|---|---|---|
| 4 | VOCl$_3$—Al(Et)$_2$Cl/Al(Et)$_{1.5}$Cl$_{1.5}$ | 6 | 5/2 | 40 | 6.3 | 44 | ENB | 620 | |
| 5 | VO(OEt)Cl$_2$—Al(Et)$_{1.5}$Cl$_{1.5}$ | 7 | — | 35 | 7.5 | 50 | DPCD | 400 | |
| 6 | VO(OEt)Cl$_2$—Al(Et)$_{1.5}$Cl$_{1.5}$ | 7 | — | 45 | 6.3 | 35 | ENB | 320 | |
| 7 | VOCl$_3$—Al(Et)$_2$Cl/Al(Et)$_{1.5}$Cl$_{1.5}$ | 6 | 5/2 | 45 | 6.7 | 66 | VNB | 90 | |
| 8 | VOCl$_3$—Al(Et)$_2$Cl/Al(Et)$_{1.5}$Cl$_{1.5}$ | 6 | 5/1 | 40 | 6.8 | 9.0 | VNB | 0 | |

| | α-olefin | Rate of feeding ethylene/α-olefin (kg/h) | H$_2$ (NL/h) | Yield (kg/h) | Ethylene content (mol %) | (η) (dl/g) | IV (g/100 g) | $\gamma_2/\gamma_1$ | Density ν of effective network-chains (× 10$^{19}$/cm$^3$) | Log ($\gamma_2/\gamma_1$)/ν × 10$^{-19}$ | Xylene-insoluble component (%) |
|---|---|---|---|---|---|---|---|---|---|---|---|
| Ex. No. | | | | | | | | | | | |
| 1 | propylene | 3.7/8.8 | 40 | 4.2 | 74 | 1.89 | 7.5 | 115.8 | 29.7 | 0.069 | 0.1 |
| 2 | propylene | 3.7/8.0 | 50 | 4.5 | 75 | 1.83 | 10.9 | 145.1 | 31.8 | 0.068 | 0.1 |
| 3 | propylene | 3.5/8.4 | 40 | 4.8 | 74 | 1.75 | 18.4 | 495.5 | 41.2 | 0.065 | 0.1 |
| 4 | butene | 3.9/24 | 0 | 2.0 | 81 | 2.62 | 5.4 | 63.3 | 28.9 | 0.062 | 0.3 |
| 5 | propylene | 3.6/3.0 | 130 | 4.2 | 75 | 2.01 | 8.0 | 338.5 | 27.4 | 0.092 | 12.5 |
| 6 | propylene | 3.6/3.0 | 40 | 4.2 | 75 | 2.81 | 8.5 | 2708 | 36.7 | 0.094 | 18.1 |
| 7 | propylene | 3.7/8.8 | 40 | 4.1 | 74 | 1.91 | 7.8 | 110.2 | 28.5 | 0.072 | 0.1 |
| 8 | propylene | 3.8/9.2 | 30 | 4.4 | 74 | 1.97 | 3.1 | 53.1 | 19.1 | 0.090 | 0.1 |
| 9 | propylene | 3.6/8.9 | 140 | 4.2 | 75 | 1.86 | 3.8 | 11000 | 20.1 | 0.198 | 0.1 |
| Comp. Ex. No. | | | | | | | | | | | |
| 1 | propylene | 3.2/9.3 | 12 | 4.5 | 66 | 1.85 | 12 | 54.6 | 14.0 | 0.124 | |
| 2 | propylene | 3.2/9.5 | 7 | 4.8 | 66 | 1.98 | 13 | 27.7 | 14.2 | 0.102 | |
| 3 | butene | 6.1/13.2 | 40 | 4.2 | 89 | 1.2 | 10 | 29.4 | 10.9 | 0.135 | |
| 4 | propylene | 3.8/16.0 | 3 | 5.1 | 66 | 2.73 | 22 | 26.5 | 19.0 | 0.075 | |
| 5 | propylene | 3.3/8.5 | 10 | 4.6 | 67 | 2.02 | 10 | 81.7 | 18.4 | 0.104 | |
| 6 | propylene | 3.8/3.0 | 5 | 4.4 | 79 | 2.62 | 11 | 17.8 | 22.8 | 0.055 | |
| 7 | propylene | 2.8/12.5 | 4 | 4.6 | 59 | 2.64 | 2.6 | 136.7 | 13.1 | 0.163 | |
| 8 | propylene | 3.9/9.5 | 20 | 3.9 | 74 | 2.26 | 0 | 20 | 5.6 | 0.232 | 0.1 |

VNB: 5-vinyl-2-norbornene
ENB: 5-ethylidene-2-norbornene
DCPD: dicyclopentadiene
MND: 5-methylene-2-norbornene

TABLE 4

| | Mitsui DCP40C (pts by wt.) | San ester EG (pts by wt.) | Cross-linking density (× 10$^{19}$/cm$^3$) | M$_{50}$ (MPa) | T$_B$ (MPa) | E$_B$ (%) | H$_A$ | C$_S$ (%) | A$_H$ | Thermal aging resistant properties A$_R$ (T$_B$) (%) | A$_R$ (E$_B$) (%) | Roll workability | Extrusion workability |
|---|---|---|---|---|---|---|---|---|---|---|---|---|---|
| Ex. No. | | | | | | | | | | | | | |
| 10 | 4 | 2 | 9.0 | 1.5 | 12.5 | 270 | 70 | 19 | +12 | 88 | 65 | 5 | 5 |
| 11 | 4 | 2 | 12.0 | 1.8 | 11.5 | 200 | 70 | 18 | +14 | 85 | 57 | 5 | 5 |
| 12 | 4 | 2 | 16.5 | 1.9 | 11.0 | 140 | 71 | 13 | +16 | 79 | 48 | 5 | 5 |
| 13 | 4 | 2 | 12.0 | 2.0 | 14.8 | 210 | 72 | 12 | +7 | 110 | 80 | 4 | 4 |
| 14 | 4 | 2 | 10.8 | 1.3 | 12.8 | 230 | 66 | 14 | +10 | 89 | 62 | 5 | 5 |
| 15 | 4 | 2 | 15.3 | 1.6 | 13.8 | 190 | 69 | 12 | +12 | 85 | 64 | 4 | 4 |
| 16 | 4 | 2 | 8.9 | 1.4 | 13.8 | 280 | 70 | 19 | +12 | 85 | 63 | 5 | 5 |
| 17 | 4 | 2 | 7.2 | 1.2 | 14.5 | 490 | 67 | 30 | +10 | 85 | 75 | 5 | 5 |
| 18 | 4 | 2 | 7.8 | 1.2 | 8.5 | 450 | 65 | 31 | +10 | 82 | 72 | 5 | 5 |
| Comp. Ex. No. | | | | | | | | | | | | | |
| 9 | 4 | 2 | 4.5 | 1.0 | 13.8 | 520 | 68 | 38 | +8 | 48 | 39 | 5 | 5 |
| 10 | 4 | 2 | 4.4 | 1.0 | 14.5 | 540 | 68 | 39 | +9 | 45 | 38 | 5 | 5 |
| 11 | 4 | 2 | 3.8 | 2.3 | 15.8 | 650 | 82 | 43 | +8 | 56 | 45 | 4 | 5 |
| 12 | 4 | 2 | 6.8 | 1.1 | 13.5 | 490 | 68 | 31 | +15 | 43 | 35 | 3 | 4 |
| 13 | 4 | 2 | 7.2 | 1.2 | 13.8 | 470 | 68 | 30 | +12 | 44 | 28 | 4 | 4 |
| 14 | 4 | 2 | 7.8 | 1.2 | 13.8 | 450 | 72 | 31 | +10 | 50 | 51 | 2 | 2 |
| 15 | 4 | 2 | 4.5 | 1.0 | 14.2 | 510 | 67 | 37 | +8 | 88 | 70 | 5 | 5 |
| 16 | 4 | 2 | 2.3 | 0.8 | 14.3 | 820 | 66 | 50 | +6 | 75 | 90 | 5 | 5 |

VNB: 5-vinyl-2-norbornene
ENB: 5-ethylidene-2-norbornene
DCPD: dicyclopentadiene

Examples 19 to 27 and Comparative Examples 17 to 20

Polymers having dissimilar properties were obtained in the same manner as in Example 1 but by changing the polymerization conditions as shown in Table 5. The obtained copolymers were evaluated in the same manner as in Example 1. The polymerization conditions and the copolymers were as shown in Table 5.

Example 28

The ethylene/propylene/5-vinyl-norbornene copolymer of Example 19:

Ethylene/propylene (molar ratio)=68/32,

Intrinsic viscosity [η] of 2.6 dl/g as measured in a decalin heated at 135° C.,

Iodine value=5, and the blending agents shown in Table 1 were kneaded together by using the Bumbury's mixer having a content of 1.7 liters at a temperature of 140 to 150° C. for 5 minutes to obtain a blend (1).

Next, the blend (1) was wound on the 8-inch open rolls [manufactured by Nippon Roll Co.], the blending agents were added on the open rolls so that the blending recipe was as shown in Table 2, followed by kneading for 3 minutes to obtain a blend (2) which was then put to the sheet-forming operation to obtain a 3 mm-thick uncrosslinked sheet. The temperatures on the surfaces of the rolls were 50° C. on the front roll and 60° C. on the rear roll.

The thus obtained uncrosslinked sheet was put into a Geer's oven of the hot-air type and was held at 170° C. for 30 minutes to obtain a 2 mm-thick crosslinked sheet.

The obtained crosslinked sheet was tested for its tension characteristics and aging characteristics. The uncrosslinked sheet was subjected to the testing for scratching the crosslinked surface, and the uncrosslinked blend was subjected to the turbidity testing with a xylene extraction solution.

In these testing methods, described below are those that were not described in Example 10. Scratching on the surface of the crosslinked sheet:

A sheet of the uncrosslinked rubber composition was crosslinked with the hot air heated at 170° C. for 30 minutes using the Geer's aging tester. Immediately thereafter, the surface of the crosslinked sheet was scratched with a pencil of HB, and the scratched state was observed by eyes.

A: Was not almost scratched.
B: Scratched very little.
C: Scratched little.
D: Scratched to a conspicuous degree.

Turbidity of Xylene Extraction solution

Turbidity of the xylene extraction solution due to the crosslinked product was measured as described below, and was regarded to be the crosslinking degree on the surface of the crosslinked sheet, i.e., index of surface adhesive property.

The uncrosslinked blend was formed into a 2 mm-thick sheet. A test piece of a size of 4 cm×5 cm was punched from the uncrosslinked sheet and was crosslinked with the hot air heated at 170° C. for 30 minutes.

Then, the obtained crosslinked rubber test piece was immersed in xylene maintained at 25° C. for 48 hours, and the turbidity of the xylene solution was measured by using a turbidimeter, trade name: SEP-PT-5010, manufactured by Mitsubishi Kasei Co.

The results were as shown in Table 6.

Example 29

The procedure was carried out in the same manner as in Example 28 but using, as an organic peroxide (B), Kayakumil AD-40C (trade name) manufactured by Kayaku Akuzo Co.

The results were as shown in Table 6.

Example 30

The procedure was carried out in the same manner as in Example 28 but using the below-mentioned ethylene/propylene/5-vinyl-2-norbornene copolymerized rubber (Example 20) instead of using the ethylene/propylene/5-vinyl-2-norbornene copolymerized rubber of Example 19.

Ethylene/propylene/5-vinyl-2-norbornene copolymerized rubber (Example 20):

Ethylene/propylene (molar ratio)=74/26,

Intrinsic viscosity [η]=2.2 dl/g as measured in a decalin heated at 135° C.,

Iodine value=5.

The results were as shown in Table 6.

Example 31

The procedure was carried out in the same manner as in Example 28 but using the below-mentioned ethylene/propylene/5-vinyl-2-norbornene copolymerized rubber (Example 21) instead of using the ethylene/propylene/5-vinyl-2-norbornene copolymerized rubber of Example 19.

Ethylene/propylene/5-vinyl-2-norbornene copolymerized rubber (Example 21):

Ethylene/propylene (molar ratio)=74/26,

Intrinsic viscosity [η]=2.2 dl/g as measured in a decalin heated at 135° C.,

Iodine value=10.

The results were as shown in Table 6.

Example 32

The procedure was carried out in the same manner as in Example 28 but using the below-mentioned ethylene/propylene/5-vinyl-2-norbornene copolymerized rubber (Example 22) instead of using the ethylene/propylene/5-vinyl-2-norbornene copolymerized rubber of Example 19, and further using an organic peroxide and a crosslinking assistant in amounts of 2 parts by weight and 1.1 parts by weight, respectively.

Ethylene/propylene/5-vinyl-2-norbornene copolymerized rubber (Example 22):

Ethylene/propylene (molar ratio)=74/26,

Intrinsic viscosity [η]=2.2 dl/g as measured in a decalin heated at 135° C.,

Iodine value=15.

The results were as shown in Table 6.

Example 33

The procedure was carried out in the same manner as in Example 28 but using the below-mentioned ethylene/propylene/5-vinyl-2-norbornene copolymerized rubber (Example 23) instead of using the ethylene/propylene/5-vinyl-2-norbornene copolymerized rubber of Example 19, and further using an organic peroxide and a crosslinking assistant in amounts of 2 parts by weight and 1.1 parts by weight, respectively.

Ethylene/propylene/5-vinyl-2-norbornene copolymerized rubber (Example 23):

Ethylene/propylene (molar ratio)=74/26,

Intrinsic viscosity [η]=1.2 dl/g as measured in a decalin heated at 135° C.,

Iodine value=30.

33

The results were as shown in Table 6.

Example 34

The procedure was carried out in the same manner as in Example 28 but using the below-mentioned ethylene/1-butene/5-vinyl-2-norbornene copolymerized rubber (Example 24) instead of using the ethylene/propylene/5-vinyl-2-norbornene copolymerized rubber of Example 19, and further using an organic peroxide and a crosslinking assistant in amounts of 4 parts by weight and 2.3 parts by weight, respectively.

Ethylene/1-butene/5-vinyl-2-norbornene copolymerized rubber (Example 24):

Ethylene/1-butene (molar ratio)=80/20,

Intrinsic viscosity [η]=3.0 dl/g as measured in a decalin heated at 135° C.,

Iodine value=5.

The results were as shown in Table 6.

Example 35

The procedure was carried out in the same manner as in Example 28 but using the below-mentioned ethylene/1-hexene/5-vinyl-2-norbornene copolymerized rubber (Example 25) instead of using the ethylene/propylene/5-vinyl-2-norbornene copolymerized rubber of Example 19, and further using an organic peroxide and a crosslinking assistant in amounts of 4 parts by weight and 2.3 parts by weight, respectively.

Ethylene/1-hexene/5-vinyl-2-norbornene copolymerized rubber (Example 25):

Ethylene/1-hexene (molar ratio)=80/20,

Intrinsic viscosity [η]=3.0 dl/g as measured in a decalin heated at 135° C.,

Iodine value=5.

The results were as shown in Table 6.

Example 36

The procedure was carried out in the same manner as in Example 28 but using the below-mentioned ethylene/1-octene/5-vinyl-2-norbornene copolymerized rubber (Example 26) instead of using the ethylene/propylene/5-vinyl-2-norbornene copolymerized rubber of Example 19, and further using an organic peroxide and a crosslinking assistant in amounts of 4 parts by weight and 2.3 parts by weight, respectively.

Ethylene/1-octene/5-vinyl-2-norbornene copolymerized rubber (Example 26):

Ethylene/1-octene (molar ratio)=80/20,

Intrinsic viscosity [η]=3.0 dl/g as measured in a decalin heated at 135° C.,

Iodine value=5.

The results were as shown in Table 6.

Example 37

The procedure was carried out in the same manner as in Example 28 but using the below-mentioned ethylene/propylene/5-methylene-2-norbornene copolymerized rubber (Example 27) instead of using the ethylene/propylene/5-vinyl-2-norbornene copolymerized rubber of Example 19, and further using an organic peroxide and a crosslinking assistant in amounts of 4 parts by weight and 2.3 parts by weight, respectively.

Ethylene/propylene/5-methylene-2-norbornene copolymerized rubber (Example 27):

34

Ethylene/propylene (molar ratio)=80/20,

Intrinsic viscosity [η]=3.0 dl/g as measured in a decalin heated at 135° C.,

Iodine value=5.

The results were as shown in Table 6.

Comparative Example 21

The procedure was carried out in the same manner as in Example 28 but using the below-mentioned ethylene/propylene/5-ethylidene-2-norbornene copolymerized rubber (Comparative Example 17) instead of using the ethylene/propylene/5-vinyl-2-norbornene copolymerized rubber of Example 19.

Ethylene/propylene/5-ethylidene-2-norbornene copolymerized rubber (Comparative Example 17):

Ethylene/propylene (molar ratio)=66/34,

Intrinsic viscosity [η]=2.2 dl/g as measured in a decalin heated at 135° C.,

Iodine value=13.

The results were as shown in Table 6.

Comparative Example 22

The procedure was carried out in the same manner as in Example 28 but using the below-mentioned ethylene/propylene/dicyclopentadiene copolymerized rubber (Comparative Example 18) instead of using the ethylene/propylene/5-vinyl-2-norbornene copolymerized rubber of Example 19.

Ethylene/propylene/dicyclopentadiene copolymerized rubber (Comparative Example 18):

Ethylene/propylene (molar ratio)=66/34,

Intrinsic viscosity [η]=2.2 dl/g as measured in a decalin heated at 135° C.,

Iodine value=10.

The results were as shown in Table 6.

Comparative Example 23

The procedure was carried out in the same manner as in Example 28 but using the below-mentioned ethylene/propylene copolymerized rubber (Comparative Example 19) instead of using the ethylene/propylene/5-vinyl-2-norbornene copolymerized rubber of Example 19.

Ethylene/propylene copolymerized rubber (Comparative Example 19):

Ethylene/propylene (molar ratio)=70/30,

Intrinsic viscosity [η]=2.4 dl/g as measured in a decalin heated at 135° C.,

Iodine value=0.

The results were as shown in Table 6.

Comparative Example 24

The procedure was carried out in the same manner as in Example 28 but using the below-mentioned ethylene/propylene/5-vinylidene-2-norbornene copolymerized rubber (Comparative Example 20) instead of using the ethylene/propylene/5-vinyl-2-norbornene copolymerized rubber of Example 19, and further using 1.5 parts by weight of sulfur instead of using the organic peroxide or the crosslinking assistant, and using 0.5 parts by weight of Nokuceller M (trade name) manufactured by Ouchi-Shinko Kagaku Kogyo Co. and 1.0 part by weight of Nokuceller TT (trade name) as the curing promotor.

Ethylene/propylene/5-vinylidene-2-norbornene copolymerized rubber (Comparative Example 20):

Ethylene/propylene (molar ratio)=74/26,

Intrinsic viscosity [η]=2.2 dl/g as measured in a decalin heated at 135° C.

Iodine value=15.

The results were as shown in Table 6.

TABLE 5

| | Catalyst | Al/V | Al(Et)₂CL/ Al(Et)$_{1.5}$Cl$_{1.5}$ | Polymerization temp(° C.) | Polymerization pressure (kgf/cm²) | Rate of feeding catalyst (mM/h) | Norbornene compound | Rate of feeding norbornene compound (g/h) |
|---|---|---|---|---|---|---|---|---|
| Ex. No. | | | | | | | | |
| 19 | VOCl₃—Al(Et)₂Cl/Al(Et)$_{1.5}$Cl$_{1.5}$ | 6 | 4/1 | 40 | 6.5 | 48 | VNB | 480 |
| 20 | VOCl₃—Al(Et)₂Cl/Al(Et)$_{1.5}$Cl$_{1.5}$ | 6 | 5/1 | 40 | 6.8 | 48 | VNB | 480 |
| 21 | VOCl₃—Al(Et)₂Cl/Al(Et)$_{1.5}$Cl$_{1.5}$ | 6 | 5/1 | 40 | 6.5 | 48 | VNB | 480 |
| 22 | VOCl₃—Al(Et)₂Cl/Al(Et)$_{1.5}$Cl$_{1.5}$ | 7 | 5/1 | 35 | 6.4 | 65 | VNB | 280 |
| 23 | VOCl₃—Al(Et)₂Cl/Al(Et)$_{1.5}$Cl$_{1.5}$ | 7 | 5/1 | 40 | 6.5 | 120 | VNB | 380 |
| 24 | VOCl₃—Al(Et)$_{2.5}$Cl$_{1.5}$ | 6 | — | 35 | 5.0 | 14 | VNB | 400 |
| 25 | VOCl₃—Al(Et)$_{2.5}$Cl$_{1.5}$ | 6 | — | 35 | 5.1 | 18 | VNB | 310 |
| 26 | VOCl₃—Al(Et)$_{2.5}$Cl$_{1.5}$ | 6 | — | 35 | 4.9 | 16 | VNB | 120 |
| 27 | VOCl₃—Al(Et)$_{2.5}$Cl$_{1.5}$ | 6 | — | 40 | 5.3 | 14 | MNB | 380 |
| Comp. Ex. No. | | | | | | | | |
| 17 | VOCl₃—Al(Et)₂Cl/Al(Et)$_{1.5}$Cl$_{1.5}$ | 6 | 5/1 | 45 | 6.5 | 65 | ENB | 480 |
| 18 | VOCl₃—Al(Et)₂Cl/Al(Et)$_{1.5}$Cl$_{1.5}$ | 6 | 7/2 | 45 | 6.5 | 75 | DCPD | 350 |
| 19 | VOCl₃—Al(Et)₂Cl/Al(Et)$_{1.5}$Cl$_{1.5}$ | 6 | 5/2 | 40 | 6.5 | 65 | VNB | 400 |
| 20 | VOCl₃—Al(Et)₂Cl/Al(Et)$_{1.5}$Cl$_{1.5}$ | 7 | 5/1 | 40 | 6.4 | 65 | EPR | 620 |

| | α-olefin | Rate of feeding ethylene/α-olefin (kg/h) | H₂ (NL/h) | Yield (kg/h) | Density ν of effective network-chains (× 10¹⁹/cm³) | X Log $(\gamma_2/\gamma_1)/\nu$ (× 10⁻¹⁹) |
|---|---|---|---|---|---|---|
| Ex. NO. | | | | | | |
| 19 | propylene | 3.7/8.8 | 50 | 4.5 | 14.2 | 0.102 |
| 20 | propylene | 3.7/8.0 | 50 | 4.5 | 14.0 | 0.124 |
| 21 | propylene | 3.7/8.0 | 50 | 4.5 | 18.5 | 0.095 |
| 22 | propylene | 3.5/8.4 | 40 | 4.8 | 35.8 | 0.065 |
| 23 | propylene | 3.2/8.0 | 60 | 4.6 | 65.2 | 0.065 |
| 24 | butene-1 | 3.9/24 | 1 | 2.0 | 28.9 | 0.062 |
| 25 | hexene-1 | 3.9/40 | 1 | 2.1 | 27.5 | 0.063 |
| 26 | octene-1 | 3.9/50 | 1 | 2.1 | 28.5 | 0.061 |
| 27 | propylene | 3.4/8.0 | 1 | 2.2 | 28.5 | 0.063 |
| Comp. Ex. No. | | | | | | |
| 17 | propylene | 3.2/9.5 | 7 | 4.8 | 14.0 | 0.124 |
| 18 | propylene | 3.2/9.3 | 12 | 4.5 | 14.2 | 0.102 |
| 19 | propylene | 3/12 | 25 | 4.5 | 10.9 | 0.135 |
| 20 | propylene | 3.5/8 | 40 | 4.8 | 19.0 | 0.075 |

VNB: 5-vinyl-2-norbornene

ENB: 5-ethylidene-2-norbornene

DCPD: dicyclopentadiene

TABLE 6

| | Examples | | | | | | | | | |
|---|---|---|---|---|---|---|---|---|---|---|
| | 28 | 29 | 30 | 31 | 32 | 33 | 34 | 35 | 36 | 37 |
| Composition (pts by wt.) | | | | | | | | | | |
| *Copolymerized rubber* | | | | | | | | | | |
| Ethylene-propylene-VNB copolymerized rubber | 100 | 100 | — | — | — | — | — | — | — | — |
| Ethylene-propylene-VNB copolymerized rubber | — | — | 100 | — | — | — | — | — | — | — |
| Ethylene-propylene-VNB copolymerized rubber | — | — | — | 100 | — | — | — | — | — | — |
| Ethylene-propylene-VNB copolymerized rubber | — | — | — | — | 100 | — | — | — | — | — |
| Ethylene-propylene-VNB copolymerized rubber | — | — | — | — | — | 100 | — | — | — | — |
| Ethylene-1-butene-VNB copolymerized rubber | — | — | — | — | — | — | 100 | — | — | — |
| Ethylene-1-hexene-VNB copolymerized rubber | — | — | — | — | — | — | — | 100 | — | — |
| Ethylene-1-octene-VNB copolymerized rubber | — | — | — | — | — | — | — | — | 100 | — |
| Ethylene-1-propylene-MNB copolymerized rubber | — | — | — | — | — | — | — | — | — | 100 |
| Dicumyl peroxide, conc. 40% | | | | | | | | | | |
| Mitsui DCP-40C (trade name) | 7 | — | 7 | 7 | 2 | 2 | 4 | 4 | 4 | 4 |
| Kayakumyl AD-40C (trade name) | — | 7 | — | — | — | — | — | — | — | — |
| Crosslinking assistant | 4 | 4 | 4 | 4 | 1.1 | 1.1 | 2.3 | 2.3 | 2.3 | 2.3 |
| Rubber properties | | | | | | | | | | |
| *Normal state* | | | | | | | | | | |
| TB (MPa) | 15.4 | 15.2 | 12.8 | 11.5 | 11.1 | 10.5 | 17.5 | 18.2 | 18.8 | 18.5 |
| EB (%) | 420 | 480 | 180 | 150 | 280 | 180 | 180 | 185 | 185 | 200 |
| *Antioxidizing property (175° C. × 168 hrs)* | | | | | | | | | | |
| Tensile strength retaining factor AR (TB) (%) | 85 | 81 | 82 | 79 | 68 | 60 | 83 | 85 | 86 | 84 |
| Elongation retaining factor AP (EB) (%) | 82 | 83 | 79 | 78 | 70 | 68 | 82 | 81 | 84 | 78 |
| Scratching of surface | C | C | B | B | B-A | B-A | B-A | B-A | B-A | B-A |
| Turbidity of xylene solution | 2.2 | 2.4 | 1.5 | 1.3 | 0.8 | 0.3 | 0.6 | 0.5 | 0.5 | 0.4 |

| | Comparative Examples | | | |
|---|---|---|---|---|
| | 17 | 18 | 19 | 20 |
| Composition (pts by wt.) | | | | |
| *Copolymerized rubber* | | | | |
| Ethylene-propylene-ENB copolymerized rubber | — | — | — | — |
| Ethylene-propylene-ENB copolymerized rubber | 100 | — | — | — |
| Ethylene-propylene-ENB copolymerized rubber | — | — | — | — |
| Ethylene-propylene-DCPD copolymerized rubber | — | — | — | — |
| Ethylene-propylene-DCPD copolymerized rubher | — | 100 | — | — |
| Ethylene-propylene-1,4HD copolymerized rubber | — | — | — | — |
| Ethylene-propylene-1,4HD copolymerized rubber | — | — | — | — |
| Ethylene-propylene-VNB copolymerized rubber | — | — | 100 | — |
| Ethylene-propylene copolymerized rubber | — | — | — | — |
| Ethylene-propylene-VNB copolymerized rubber | — | — | — | 100 |
| Dicumyl peroxide, conc. 40% | | | | |
| Mitsui DCP-4DC (trade name) | 7 | 7 | 7 | — |
| Crosslinking assistant | 4 | 4 | 4 | — |
| Sulfer | — | — | — | 1.5 |
| *Curing promotor* | | | | |
| Nokuceller M (trade name) | — | — | — | 0.5 |
| Nokuceller TT (trade name) | — | — | — | 1.0 |
| Rubber properties | | | | |
| *Normal state* | | | | |
| TB (MPa) | 12.2 | 13.1 | 11.8 | 18.5 |
| EB (%) | 270 | 250 | 200 | 200 |
| *Antioxidizing property (175° C. × 168 hrs)* | | | | |
| Tensile strength retaining factor AR (TB) (%) | 72 | 65 | 85 | 8 |
| Elongation retaining factor AR (EB) (%) | 72 | 62 | 81 | 6 |
| Scratching of surface | D | D | D | A |
| Turbidity of xylene solution | 5.8 | 4.1 | 3.5 | 0.2 |

VNB: 5-vinyl-2-norbornene
MNB: 5-methyl-2-norbornene
DCPD: dicyclopentadinene
1,4HD: 1,4-hexadiene As will be understood from Table 6, according to the Examples of the present invention, the surfaces of the crosslinked products are little scratched, turbidity in the xylene solution is low, and the crosslinked rubber after aged exhibits tensile strength retaining factor and elongation retaining factor of larger than 60%, featuring excellent thermal aging resistant property.

What is claimed is:

1. An amorphous or low-crystalline ethylene random copolymer derived from an ethylene (a), an α-olefin (b) having 3 to 20 carbon atoms and a nonconjugated polyene (c) having a norbornene skeleton, and simultaneously satisfying the following requirements (1) to (6):

(1) the molar ratio (a)/(b) of the ethylene (a) to the α-olefin (b) is from 40/60 to 95/5;

(2) the amount of the nonconjugated polyene (c) is from 0.5 to 50 (g/100 g) in terms of an iodine value of the copolymer;

(3) the effective network-chain density ν is not smaller than $1.5 \times 10^{20}$ number/cm$^3$ when press-cured at 170° C. for 10 minutes by using 0.01 mol of a dicumyl peroxide per 100 g of the copolymer;

(4) the effective network-chain density ν and a ratio γ2/γ1 of a shearing rate γ2 of when a shearing stress $2.4 \times 10^6$ dynes/cm$^2$ is exhibited to a shearing rate γ1 of when a shearing stress $0.4 \times 10^6$ dynes/cm$^2$ is exhibited as found from a melt flow curve at 100° C., establish a relationship represented by the general formula (I), $$0.04 \times 10^{-19} \leq \log(\gamma 2/\gamma 1)/\nu \leq 0.020 \times 10^{-19} \tag{I}$$

and;

(5) an intrinsic viscosity (η) as measured in decalin at 135° C. is from 0.5 to 10 dl/g (6) a molecular weight distribution (Mw/Mn) of from 3 to 50.

2. An ethylene random copolymer according to claim 1, wherein the nonconjugated polyene (c) is a norbornene compound represented by the following formula [II],

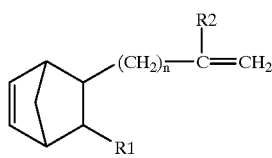

[II]

wherein n is an integer of from 0 to 10, R1 is a hydrogen atom or an alkyl group having 1 to 10 carbon atoms, and R2 is a hydrogen atom or an alkyl group having 1 to 5 carbon atoms, and/or by the following formula [III],

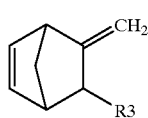

[III]

wherein R3 is a hydrogen atom or an alkyl group having 1 to 10 carbon atoms.

3. A process for preparing an ethylene random copolymer of claim 1, by a copolymerization of the ethylene (a), α-olefin (b) having 3 to 20 carbon atoms and nonconjugated polyene (c) having a norbornene skeleton in the presence of a catalyst, wherein said catalyst comprises:

a soluble vanadium compound represented by the following formula [IV],

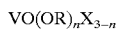

VO(OR)$_n$X$_{3-n}$ [IV]

wherein R is a hydrocarbon group, X is a halogen atom, and $0 \leq n \leq 3$, and an organoaluminum compound represented by the following formula [V],

R$^1_m$AlX$^1_{3-m}$ [V]

wherein R1 is a hydrocarbon group, X1 is a halogen atom, and $0 \leq m \leq 3$, said copolymerization is carried out at a polymerization temperature of from 30 to 60° C. under a polymerization pressure of from 4 to 12 kgf/cm$^2$, while supplying the ethylene and the nonconjugated polyene in amounts (molar ratio) of, $0.01 \leq$ nonconjugated polyene/ethylene $\leq 0.2$.

4. A process according to claim 3, wherein the organoaluminum compound is a blend having an Al(Et)$_2$Cl/AlEt$_{1.5}$Cl$_{1.5}$ molar ratio of from 1/5 to 10/1.

5. A process according to claim 3, wherein the organoaluminum compound is a blend having an Al(Et)$_2$Cl/AlEt$_{1.5}$Cl$_{1.5}$ molar ratio of from 1/2 to 8/1.

6. A process according to claim 4 or 5, wherein the soluble vanadium compound is VOCl$_3$.

7. A rubber composition containing 100 parts by weight of the amorphous or low-crystalline ethylene random copolymer (A) of claim 1 or 2, and from 0.05 to 10 parts by weight of an organic peroxide (B).

8. An ethylene random copolymer according to claim 1 or 2, wherein the molar ratio of (a)/(b) of the ethylene (a) to the α-olefin (b) is from 55/45 to 85/15.

9. An ethylene random copolymer according to claim 1 or 2, wherein the residual cumulative percentage after extraction with xylene of the ethylene random copolymer is not larger than 1%.

10. An ethylene random copolymer according to claim 8, wherein the residual cumulative percentage after extraction with xylene of the ethylene random copolymer is not larger than 1%.

11. An ethylene random copolymer according to claim 1 or 2, wherein the α-olefin (b) of the ethylene random copolymer is propylene.

12. An ethylene random copolymer according to claim 8, wherein the α-olefin (b) of the ethylene random copolymer is propylene.

13. A rubber composition containing the amorphous or low-crystalline ethylene random copolymer of claims 1 or 2.

14. Automotive industrial parts comprising the rubber composition of claim 7.

15. Rubber articles for industrial use comprising the rubber composition of claim 7.

16. Electrical insulating materials comprising the rubber composition of claim 7.

17. Articles for civil engineering and construction comprising the rubber composition of claim 7.

18. A rubber composition containing the amorphous or low-crystalline ethylene random copolymer of claims 1 or 2, and a foaming agent.

19. An article obtained by heating and foaming the rubber composition of claim 18.

20. Weather strips obtained by curing the rubber composition of claim 7.

21. Running channels for door glasses obtained by curing the rubber composition of claim 7.

22. Window frames obtained by curing the rubber composition of claim 7.

23. Radiator hoses obtained by curing the rubber composition of claim 7.

24. Brake parts obtained by curing the rubber composition of claim 7.

25. Wiper blades obtained by curing the rubber composition of claim 7.

26. Rubber roll for industrial use obtained by curing the rubber composition of claim 7.

27. Belts for industrial use obtained by curing the rubber composition of claim 7.

28. Packing for industrial use obtained by curing the rubber composition of claim 7.

29. Hoses for industrial use obtained by curing the rubber composition of claim 7.

30. Anode caps obtained by curing the rubber composition of claim 7.

31. Grommets obtained by curing the rubber composition of claim 7.

32. Covering material for electrical wires obtained by curing the rubber composition of claim 7.

33. Gaskets for construction obtained by curing the rubber composition of claim 7.

34. Sheet for civil engineering obtained by curing the rubber composition of claim 7.

35. Rubber sheet obtained by curing the rubber composition of claim 7.

36. Heat insulating material obtained by heating and foaming the rubber composition of claim 18.

37. Cushioning material obtained by heating and foaming the rubber composition of claim 18.

38. Sealing material obtained by heating and foaming the rubber composition of claim 18.

* * * * *

UNITED STATES PATENT AND TRADEMARK OFFICE
CERTIFICATE OF CORRECTION

PATENT NO. : 6,140,441
DATED : October 31, 2000
INVENTOR(S) : Takashi Hakuta et al.

It is certified that error appears in the above-identified patent and that said Letters Patent is hereby corrected as shown below:

Column 39,
Line 30, please amend formula (I) as follows:
replace "$0.04 \times 10^{-19} \leq \log(\gamma_2/\gamma_1)/\upsilon \leq 0.020 \times 10^{-19}$ (I)"
with -- $0.04 \times 10^{-19} \leq \log(\gamma_2/\gamma_1)/\upsilon \leq 0.20 \times 10^{-19}$ (I) --

Signed and Sealed this

Twenty-fifth Day of January, 2005

JON W. DUDAS
*Director of the United States Patent and Trademark Office*